US012812701B2

(12) United States Patent
Yang

(10) Patent No.: US 12,812,701 B2
(45) Date of Patent: Nov. 24, 2026

(54) METHOD AND APPARATUS ON MEDIA ADAPTATION IN MOBILE COMMUNICATION SYSTEMS SUPPORTING MEDIA-AWARE PACKET HANDLING

(71) Applicant: Samsung Electronics Co., Ltd., Suwon-si (KR)

(72) Inventor: Hyunkoo Yang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 264 days.

(21) Appl. No.: 18/405,659

(22) Filed: Jan. 5, 2024

(65) Prior Publication Data

US 2024/0237087 A1 Jul. 11, 2024

(30) Foreign Application Priority Data

Jan. 5, 2023 (KR) ........................ 10-2023-0001896

(51) Int. Cl.
*H04W 76/10* (2018.01)
*H04W 80/10* (2009.01)

(52) U.S. Cl.
CPC ............ *H04W 76/10* (2018.02); *H04W 80/10* (2013.01)

(58) Field of Classification Search
CPC ..... H04W 76/10; H04W 80/10; H04W 24/10; H04W 28/0268; H04L 65/80; H04L 65/1069
See application file for complete search history.

(56) References Cited

U.S. PATENT DOCUMENTS

| | | | | |
|---|---|---|---|---|
| 2010/0040050 | A1 | 2/2010 | Johnston | |
| 2020/0092943 | A1 | 3/2020 | Tang | |
| 2023/0283411 | A1* | 9/2023 | Zheng | H04L 1/0076 370/241 |
| 2025/0247738 | A1* | 7/2025 | Pan | H04W 28/02 |
| 2025/0274809 | A1* | 8/2025 | Liao | H04W 28/0263 |
| 2025/0323983 | A1* | 10/2025 | De Foy | H04L 65/1108 |
| 2025/0392550 | A1* | 12/2025 | Hong | H04L 47/28 |

(Continued)

FOREIGN PATENT DOCUMENTS

| | | |
|---|---|---|
| CN | 11597504 A | 11/2022 |
| WO | 2022/017517 A1 | 1/2022 |

OTHER PUBLICATIONS

Vivo, "Solution for KI#4&5 handling PDU Set within QoS flow", SA WG2 Meeting #150E (e-meeting), S2-2202111 (Year: 2022).*

(Continued)

*Primary Examiner* — Ayaz R Sheikh
*Assistant Examiner* — Mang Boi Thawng
(74) *Attorney, Agent, or Firm* — Jefferson IP Law, LLP

(57) ABSTRACT

A method performed by a user equipment (UE) in a wireless communication system is provided. The method includes performing packet data unit (PDU) session establishment procedure with at least one network entity, receiving, from a media server, PDU set marking information for generating a PDU set reception report, receiving, from the media server, media packets processed based on PDU set, generating the PDU set reception report based on the media packets and the PDU set marking information, and transmitting, to the media server, the PDU set reception report including information on at least one PDU set.

20 Claims, 14 Drawing Sheets

(56) References Cited

U.S. PATENT DOCUMENTS

2026/0067741 A1 * 3/2026 Stoica ................ H04L 47/2416

OTHER PUBLICATIONS

Huawei, HiSilicon, KDDI, "KI#4: Solution for PDU Set integrated QoS handling", 3GPP TSG-WG SA2 Meeting #150E e-meeting, S2-2202408 (Year: 2022).*

CATT, "New Solution for KI#4/5: PDU Set Identification and Marking", 3GPP TSG-WG SA2 Meeting #150E e-meeting, S2-2202716 (Year: 2022).*

3rd Generation Partnership Project; Technical Specification Group Services and System Aspects; Study on XR (Extended Reality) and media services (Release 18), 3GPP TR 23.700-60 V18.0.0 (Dec. 2022), Dec. 21, 2022.

International Search Report dated Apr. 1, 2024, issued in International Application No. PCT/KR2024/000268.

* cited by examiner

METHOD AND APPARATUS ON MEDIA ADAPTATION IN MOBILE COMMUNICATION SYSTEMS SUPPORTING MEDIA-AWARE PACKET HANDLING

CROSS-REFERENCE TO RELATED APPLICATION(S)

The application is based on and claims priority under 35 U.S.C. § 119(a) of a Korean patent application number 10-2023-0001896, filed on Jan. 5, 2023, in the Korean Intellectual Property Office, the disclosure of which is incorporated by reference herein in its entirety.

BACKGROUND

1. Field

The disclosure relates to a wireless communication system. More particularly, the disclosure relates to a method and apparatus for providing network adaptive media services in wireless networks such as fifth generation (5G).

2. Description of Related Art

The 5G mobile communication technologies define broad frequency bands such that high transmission rates and new services are possible, and may be implemented not only in “Sub 6 GHz” bands such as 3.5 GHZ, but also in “Above 6 GHz” bands referred to as millimeter wave (mmWave) including 28 GHz and 39 GHz. Additionally, it has been considered to implement sixth generation (6G) mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BandWidth Part (BWP), new channel coding methods such as a Low Density Parity Check (LDPC) code for large amount of data transmission and a polar code for highly reliable transmission of control information, L2 pre-processing, and network slicing for providing a dedicated network specialized to a specific service.

There are ongoing discussions regarding improvement and performance enhancement of initial 5G mobile communication technologies in view of services to be supported by 5G mobile communication technologies, and there has been physical layer standardization regarding technologies such as Vehicle-to-everything (V2X) for aiding driving determination by autonomous vehicles based on information regarding positions and states of vehicles transmitted by the vehicles and for enhancing user convenience, New Radio Unlicensed (NR-U) aimed at system operations conforming to various regulation-related requirements in unlicensed bands, new radio (NR) user equipment (UE) Power Saving, Non-Terrestrial Network (NTN) which is UE-satellite direct communication for providing coverage in an area in which communication with terrestrial networks is unavailable, and positioning.

There has been ongoing standardization in air interface architecture/protocol regarding technologies such as Industrial Internet of Things (IIoT) for supporting new services through interworking and convergence with other industries, Integrated Access and Backhaul (IAB) for providing a node for network service area expansion by supporting a wireless backhaul link and an access link in an integrated manner, mobility enhancement including conditional handover and Dual Active Protocol Stack (DAPS) handover, and two-step random access for simplifying random access procedures (2-step random access channel (RACH) for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. New research is scheduled in connection with extended Reality (XR) for efficiently supporting Augmented Reality (AR), Virtual Reality (VR), Mixed Reality (MR) and the like, 5G performance improvement and complexity reduction by utilizing Artificial Intelligence (AI) and Machine Learning (ML), AI service support, metaverse service support, and drone communication.

Such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and Artificial Intelligence (AI) from the design stage and internalizing end-to-end AI support functions, and next-generation distributed computing technology for implementing services at levels of complexity exceeding the limit of UE operation capability by utilizing ultra-high-performance communication and computing resources.

As various services can be provided as described above and with the development of wireless communication systems, a method for effectively providing these services is required. In particular, there is a need for a method to efficiently transmit real-time media for voice and video calls, and the like.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method capable of effectively providing real-time communication services in a wireless communication system.

Additional aspects will be set forth in part in the description which follows and, in part, will be apparent from the description, or may be learned by practice of the presented embodiments.

In accordance with an aspect of the disclosure, a method performed by a user equipment (UE) in a wireless communication system is provided. The method includes performing packet data unit (PDU) session establishment procedure with at least one network entity, receiving, from a media server, PDU set marking information for generating a PDU set reception report, receiving, from the media server, media packets processed based on PDU set, generating the PDU set reception report based on the media packets and the PDU set marking information, and transmitting, to the media server, the PDU set reception report including information on at least one PDU set.

In accordance with another aspect of the disclosure, a method performed by a media server in a wireless communication system is provided. The method includes transmitting, to an application function (AF), service provisioning parameter including at least one of codec configuration, protocol configuration, marking scheme, detection scheme, quality of service (QoS) and packet handling parameters or reporting configuration, receiving, from the AF, parameters for configuration of the media server including at least one of codec configuration, protocol configuration, marking scheme, detection scheme, QoS and packet handling parameters or reporting configuration, generating media packets with PDU set marking scheme, transmitting, to a user equipment (UE), the media packets, and receiving, from the UE, a PDU set reception report including information on at least one PDU set.

In accordance with another aspect of the disclosure, a user equipment (UE) in a wireless communication system is provided. The UE includes a transceiver, one or more processors communicatively coupled with the transceiver, and memory storing one or more computer programs including computer-executable instructions that, when executed by the one or more processors, cause the UE to perform packet data unit (PDU) session establishment procedure with at least one network entity, receive, from a media server, PDU set marking information for generating a PDU set reception report, receive, from the media server, media packets processed based on PDU set, generate the PDU set reception report based on the media packets and the PDU set marking information, and transmit, to the media server, the PDU set reception report including information on at least one PDU set.

In accordance with another aspect of the disclosure, a media server in a wireless communication system is provided. The media server includes a transceiver, one or more processors communicatively coupled with the transceiver, and memory storing one or more computer programs including computer-executable instructions that, when executed by the one or more processors, cause the media server to transmit, to an application function (AF), service provisioning parameter including at least one of codec configuration, protocol configuration, marking scheme, detection scheme, QoS and packet handling parameters or reporting configuration, receive, from the AF, parameters for configuration of the media server including at least one of codec configuration, protocol configuration, marking scheme, detection scheme, QoS and packet handling parameters or reporting configuration, generate media packets with PDU set marking scheme, transmit, to a user equipment (UE), the media packets, and receive, from the UE, a PDU set reception report including information on at least one PDU set.

The apparatus and method according to the disclosure can effectively provide real-time communication services in a mobile communication system.

In accordance with another aspect of the disclosure, one or more non-transitory computer-readable storage media storing one or more computer programs including computer-executable instructions that, when executed by one or more processors of a user equipment (UE) in a wireless communication system, cause the UE to perform operations are provided. The operations include performing packet data unit (PDU) session establishment procedure with at least one network entity, receiving, from a media server, PDU set marking information for generating a PDU set reception report, receiving, from the media server, media packets processed based on PDU set, generating the PDU set reception report based on the media packets and the PDU set marking information, and transmitting, to the media server, the PDU set reception report including information on at least one PDU set.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
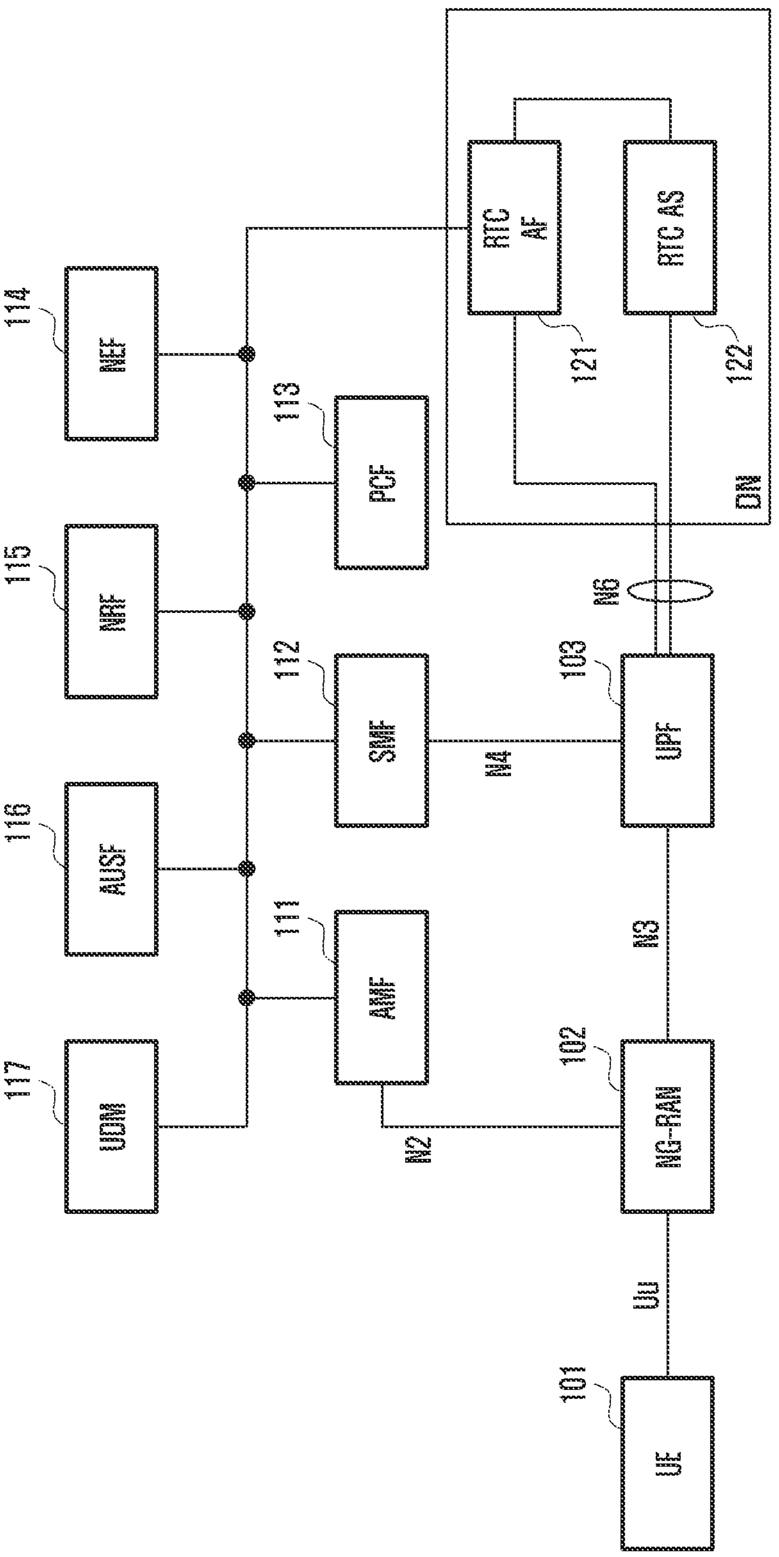
FIG. 1 is a conceptual diagram illustrating a 5G system (5GS) architecture for real-time communication service in a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms “a,” “an,” and “the” include plural referents unless the context clearly dictates otherwise. Thus, for example, reference to “a component surface” includes reference to one or more of such surface.

In the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. The disclosure is not limited to the embodiments set forth below, but may be implemented in various different forms. The embodiments are provided only to completely disclose the disclosure and fully inform those skilled in the art of the scope of the disclosure, and the disclosure is defined only by the scope of the appended claims. The same or like reference numerals designate the same or like elements.

It will be understood that each block of the flowchart illustrations, and combinations of blocks in the flowchart illustrations may be implemented by computer program instructions. These computer program instructions may be mounted on the processor of a general purpose computer, special purpose computer or other programmable data processing apparatus, so that the instructions executed by the processor of the computer or other programmable data processing apparatus create means for executing the functions specified in the flowchart block(s). These computer program instructions may, for example, also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block(s). The computer program instructions may also be loaded onto a computer or other programmable data processing apparatus to cause a series of operational steps to be performed on the computer or other programmable data processing apparatus to produce a computer implemented process such that the instructions that execute on the computer or other programmable data processing apparatus provide steps for implementing the functions specified in the flowchart block(s).

Each block of the flowchart illustrations may represent a module, segment, or portion of code, which includes one or more executable instructions for implementing the specified logical function(s). It should also be noted that in some alternative implementations, the functions noted in the blocks may occur out of the order. Two blocks shown in succession may in fact be executed substantially concurrently or the blocks may sometimes be executed in the reverse order, depending upon the functionality involved.

In this case, the term “unit” refers to a software element or a hardware element, such as a field programmable gate array (FPGA) or an application specific integrated circuit (ASIC), which performs a predetermined function. The “unit” does not always have a meaning limited to software or hardware. The “unit” may be constructed either to be stored in an addressable storage medium or to execute one or more processors. Therefore, the “unit” includes, for example, elements such as software elements, object-oriented software elements, class elements and task elements, processes, functions, properties, procedures, sub-routines, segments of a program code, drivers, firmware, micro-codes, circuits, data, database, data architectures, tables, arrays, and parameters. The functionalities provided in the elements and “units” may be combined into fewer elements and “units” or may be further separated into additional elements and “units.” Moreover, the elements and “units” or may be implemented to reproduce one or more central processing units (CPUs) within a device or a security multimedia card. Further, the “unit” in the embodiments may include one or more processors.

In describing the disclosure below, a detailed description of known functions or constitution incorporated will be omitted when it is determined that the description may make the subject matter of the disclosure unnecessarily unclear.

Hereinafter, embodiments of the disclosure will be described with reference to the accompanying drawings.

Terms for identifying access nodes, terms referring to a network entities (NFs), terms referring to messages, terms referring to interfaces between network entities, terms referring to various identification information, and the like are illustratively used for the sake of convenience. The disclosure is not limited by the terms to be described below, and other terms referring to subjects having equivalent technical meanings may be used.

The terms used in the disclosure are only used to describe specific embodiments, and are not intended to limit the disclosure. The terms used herein, including technical and scientific terms, may have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various embodiments of the disclosure will be described based on an approach of hardware, for example. Various embodiments of the disclosure include a technology that uses both hardware and software, and thus the various embodiments of the disclosure may not exclude a software-based approach.

Terms and names used in the most recent standards among the existing communication standards, i.e., in the LTE and NR standard defined in the 3rd Generation Partnership Project (3GPP) will be used. The disclosure is not, however, limited to the terms and names, and may equally apply to any systems that conform to other standards. Especially, the disclosure may be applied to the 3GPP NR (which is the 5G mobile communication standard). Additionally, the embodiments of the disclosure may also be applied to other communication systems having a similar technical background or channel form. Also, it will be understood by one of ordinary skill in the art that the embodiments of the disclosure may be applied to other communication systems through some modifications without departing from the scope of the disclosure.

The disclosure relates to a mobile communication system. In a mobile communication system supporting real-time communication service, in case where packets constituting a media stream are processed according to the same policy, that is, in case of not considering the effect of media data included in each packet on service quality, service quality optimized for a given network resource cannot be provided. A technology for improving media quality and saving network resources by utilizing a difference in the impact of media data included in each packet on service quality in a wireless communication system will be described.

In the following description, terms referring to signals, terms referring to channels, terms referring to control information, terms referring to network entities, terms referring to device elements, and the like are illustratively used for the sake of convenience. The disclosure is not limited by the terms as used below, and other terms referring to subjects having equivalent technical meanings may be used.

In addition, the disclosure describes various embodiments using the terms used in some communication standards (for example, 3rd generation partnership project (3GPP)), but this is only an example. Various embodiments of the disclosure may, for example, be easily modified and applied to other communication systems.

According to real-time communication services, a user may use an application provided by a real-time communication application provider, negotiate service configuration information, including media information, with a real-time media server or other users, establish real-time communication media sessions based on the negotiation, and exchange media data such as audio and video in real time.

In order to provide real-time communication services, 5G system (5GS) may include new generation-radio access network (NG-RAN) and user plane function (UPF) in the communication path of the real-time communication media session.

Real-time communication services may be constituted with media with various transmission characteristics such as voice, video, and text. To ensure QoS of real-time communication services, a network may, for example, consider information for identifying packets including the media data and transmission characteristics for each media. In general, a communication system defines a packet flow, which is a set of packets for which the same QoS is to be provided, and configures the operation of network entities located in the communication path of the media session. Information for configuring the operation of the network entity may include information for identifying packets belonging to the packet flow and a QoS policy to be applied to the packet belonging to the packet flow. Information for identifying the packet flow includes a transmission and reception internet protocol (IP) address, a transmitting and receiving port number (for example, Transmission control protocol (TCP) or user datagram protocol (UDP) port number), and a transport protocol identifier. For example, in a real-time communication service that includes voice and video, in case where seamless transmission of voice information is important, voice information may be transmitted through a separate packet flow that provides higher QoS.

The data units constituting the media data may not be preserved during the packetization process for network transmission and may be divided into a plurality of packets, and depending on the characteristics of the media codec, in case where some portions are damaged or lost, the media unit may be impossible to be restored at a receiving end. In case where the network processes packets belonging to the media unit independently, packets that cannot be used by the receiver may be transmitted through the network, thereby wasting network resources. Additionally, data units constituting media may have different importance and interrelationships depending on the characteristics of the media. In an example, in video compression, an intra-frame may affect the restoration of other frames that refer to the intra-frame. If packets including the intra frame are processed to have a higher priority than packets including a frame referencing the intra frame, network resources may be utilized efficiently. In order to solve the above-described problem, the disclosure provides a method for processing media packets in units of data units constituting the media and monitoring the processing result.

According to the apparatus and method according to embodiments of the disclosure described below, QoS may be provided considering media characteristics in case where real-time communication service providers provide real-time services in a 5G system (5GS).

The effects that can be obtained from the disclosure are not limited to the effects mentioned above, and other effects not mentioned may be clearly understood by those skilled in the art from the following description.

In the following descriptions, terms and names defined in standards for 5G systems will be used for convenience of explanation. However, the disclosure is not limited to the above-described terms and names, and may be equally applied to a system conforming to other standards.

It should be appreciated that the blocks in each flowchart and combinations of the flowcharts may be performed by one or more computer programs which include instructions. The entirety of the one or more computer programs may be stored in a single memory or the one or more computer programs may be divided with different portions stored in different multiple memories.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphical processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an integrated circuit (IC), or the like.

[5G System Architecture—FIG. 1]

FIG. 1 is a conceptual diagram illustrating a 5G system (5GS) architecture for real-time communication service in a wireless communication system according to an embodiment of the disclosure.

Referring to FIG. 1, a 5G system may include a user equipment (UE) 101, a NG-RAN 102 including a base station, a user plane function (UPF) device 103, an access and mobility management function (AMF) device 111, a session management function (SMF) device 112, a policy control function (PCF) device 113, a network exposure function (NEF) device 114, an NF repository function (NRF) device 115, an authentication server function (AUSF) device 116, an unified data management (UDM) device 117, a real-time communication application function (RTC AF) device 121, and a real-time communication application server (RTC AS) device 122. It is apparent that 5GS is not limited to the above examples and may include fewer or more elements than those illustrated in FIG. 1. Each device may be referred to as a network entity, network function, or network function apparatus.

Referring to FIG. 1, respective network functions (NFs) of the 5GS will be described in terms of "network entity" or "network function" itself. However, a person skilled in the art may know that an NF and/or NF device is implemented by specific one or two or more servers, and two or more NFs performing the same operation are implemented by one server.

According to embodiment of the disclosure, one NF or two or more NFs may be implemented in the form of one network slice according to circumstances. The network slice may be generated based on a specific purpose. The network slice may be, for example, configured for a subscriber group to provide a service of the same type, such as a maximum transmission rate, data usage, a guaranteed minimum transmission rate, to specific subscriber groups. In addition, the network slice may be implemented according to various purposes. Herein, additional explanation of the network slice will be omitted since it is apparent to a person skilled in the art.

Referring to FIG. 1, FIG. 1 illustrates interfaces between nodes. An Uu interface may be used between the UE 101 and the NG-RAN 102, an N2 interface may be used between the NG-RAN 102 and the AMF 111, an N3 interface may be used between the NG-RAN 102 and the UPF 103, an N4 interface may be used between the SMF 112 and the UPF 103, and an N6 interface may be used between the UPF 103 and the 5G RTC AF 121, 5G RTC AS 122 and 5G RTC AS 123 located in a data network (DN). Since the above-described interfaces are defined in the 3GPP standard, description thereof is omitted. An interface between the RTC AF 121 and RTC AS 122 and the UE will be described in the media architecture to be described later.

Figure 2:
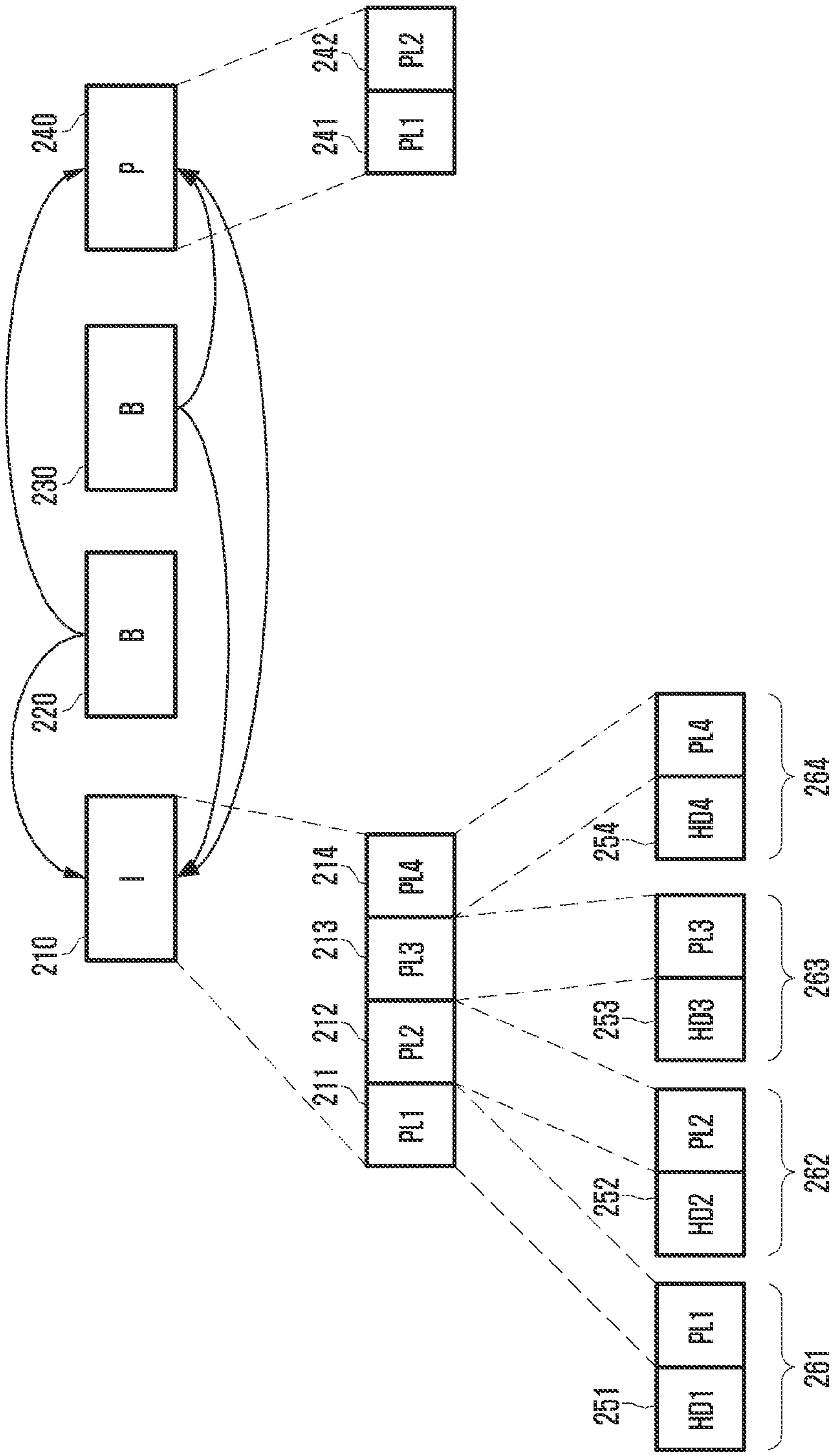
FIG. 2 is a conceptual diagram illustrating a packetization process of a video data unit in a wireless communication system according to an embodiment of the disclosure.

[PDU Set—FIG. 2]

As described above, data units constituting media data may be divided into a plurality of packets without being preserved during the packetization process for network transmission.

FIG. 2 is a conceptual diagram illustrating the packetization process of a video data unit in a wireless communication system according to an embodiment of the disclosure.

In an embodiment, general video data may be constituted with a group of pictures (GOP) including pictures such as I picture (intra-coded picture), P picture (predictive-coded picture), and B picture (bidirectional-coded picture). The group of pictures may include at least one I picture.

Referring to FIG. 2, one picture set may include one I frame 210, two B frames 220, 230, and one P frame 240, where the I frame 210 is divided into 4 payloads, PL1 211, PL2 212, PL3 213, and PL4 214 and may be transmitted as four packets 261, 262, 263, 264 including each payload. The four packets 261, 262, 263, 264 may have headers, HD1 251, HD2 252, HD3 253, HD4 254 corresponding to the respective payloads, PL1 211, PL2 212, PL3 213, PL4 214. Hereafter, a set of payloads divided from one media data unit may be referred to as a PDU Set. Referring to FIG. 2, the four payloads constituting the I frame 210, PL1 211, PL2 212, PL3 213, PL4 214, may constitute one PDU Set, and the two payloads constituting the P frame 240, PL1 241, PL 242, may constitute another PDU Set.

The packet is constituted with a header and a payload, and the header may include information necessary to process the packet in a network and transmit it to a destination. The payload may, for example, include information necessary for processing media data at the receiving end and may include a separate payload header depending on a media data processing method. The network may use the data included in the packet header and payload to identify the packet.

In case where the network identifies packets including PDU belonging to the same PDU Set, the packet may be processed based on the PDU Set. Packet loss may occur in case where communication volume exceeds the processing capacity of the network. In this case, degradation of service quality can be minimized by minimizing the number of lost PDU Sets compared to the number of lost packets through PDU Set-based packet processing. Network equipment that supports the PDU Set-based packet processing may require the function of identifying packets belonging to the same PDU Set and the processing method to be applied to the packets belonging to the PDU Set.

Figure 3:
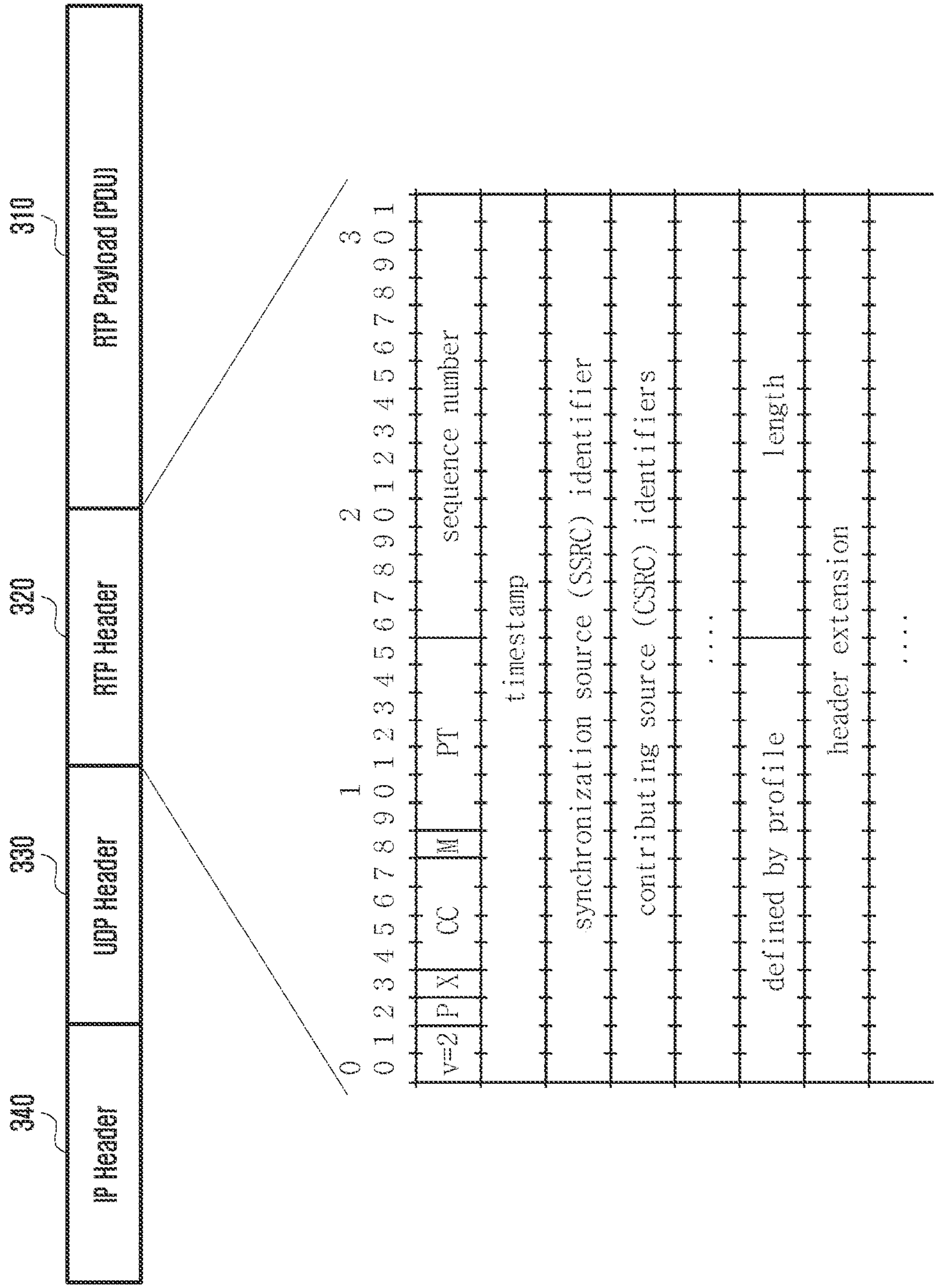
FIG. 3 is a conceptual diagram illustrating a packet header in a wireless communication system according to an embodiment of the disclosure.

[PDU Set Marking—FIG. 3]

FIG. 3 is a conceptual diagram illustrating an example of a packet header in a wireless communication system according to an embodiment of the disclosure.

Referring to FIG. 3, an RTP header 320, a UDP header 330, and an IP header 340 may be added to transmit the PDU 310. The RTP header 320 may include an RTP extension header. Referring to FIG. 3, the first 12 octets or 12 bytes of the RTP header 320 are included in all RTP packets, and the list of CSRCs may be added by a mixer. Each field of the RTP header 320 has the following meaning.

- Version (V): 2-bit field indicating the version of RTP. RTP compliant to IETF RFC 3550 has a value of 2.
- Padding (P): 1-bit field with a value of 1 in case where the RTP packet includes a padding octet.
- Extension (X): 1-bit field with a value of 1 in case where the RTP packet includes an extension header.
- CSRC count (CC): 4-bit field indicating the number of CSRC identifiers located after the 12-octet fixed header.
- Marker (M): 1-bit field, its usage is determined by the RTP profile. For example, in case where one video frame is divided into a plurality of RTP packets and transmitted, only the M field value of the last RTP packet among the RTP packets may be configured to 1.
- Payload type (PT): 7-bit field to identify an RTP payload format. The field value may be determined using static mapping determined by an RTP profile or dynamic mapping determined by an out-band method using session description protocol (SDP).
- Sequence number: 16-bit field that increases by 1 each time each RTP packet is transmitted. It may be used for loss detection and packet order restoration in a receiver.
- Timestamp: 32-bit field that may indicate the acquisition time or playback time of the data sample included in the corresponding RTP packet.
- SSRC: 32-bit field indicating an identifier of a synchronization source.
- CSRS: 32-bit field indicating an identifier of a contribution source.

A real-time media service according to an embodiment of the disclosure may include one or more media transport sessions, and information about the media transport session may be constituted with a 5-tuple (source IP address, destination IP address, source port number, destination port number, and transmission protocol). Like the packet illustrated in FIG. 3, the packet uses an RTP/UDP/IP protocol. The packets whose source/destination IP address values of the IP header 340 and source/destination port number values of the UDP header 330 are the same may be regarded as packets belonging to one media transmission session.

Information for identifying packets belonging to the PDU Set and information for determining a processing method to be applied to packets belonging to the PDU Set may be transmitted to network equipment through a packet header and PDU. A media transmission session according to one embodiment of the disclosure may transmit the above information using a packet header and payload header. The format of the specific header and payload used to transmit the information and the information included in the header and payload may vary depending on the type of protocol used in the media transmission session and the profile that operates the protocol. The method used to deliver PDU Set-related information in the media transmission session may be referred to as a PDU Set Marking method. The PDU Set Marking method according to an embodiment of the disclosure may include an RTP extension header. Additionally, the PDU Set Marking method may be included in network configuration information supporting PDU Set-based packet processing.

Figure 4:
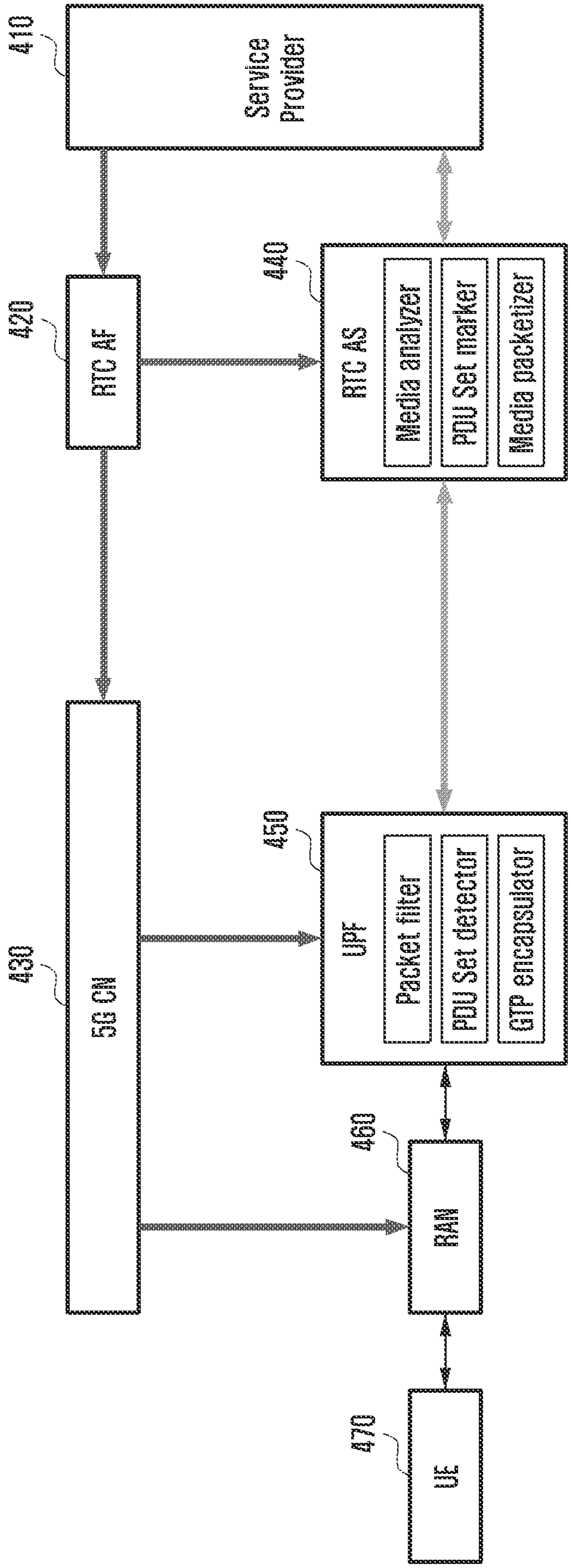
FIG. 4 is a conceptual diagram illustrating a flow of 5G system configuration information for real-time communication service in the wireless communication system according to an embodiment of the disclosure.

[5G RTC Architecture—FIG. 4]

FIG. 4 is a conceptual diagram illustrating a flow of 5G system configuration information for a real-time communication service in a wireless communication system according to an embodiment of the disclosure.

Referring to FIG. 4, an RTC AF 420 may request a 5G core network (CN) 430 to establish a real-time media transmission session including a QoS configuration parameter based on service configuration information provided by a service provider 410. The QoS configuration parameter may include information about a PDU Set Marking method. If the session establishment request is successful, the RTC AF 420 configures an RTC AS 440 serving as a stream end server, and the 5G CN 430 may configure an UPF 450 and radio access network (RAN) 460 located in the path of the real-time communication media session. When a service is initiated, the RTC AS 440 may transmit a media packet to which the PDU Set Marking is applied to the UPF 450. The PDU Set Marking may include a media analysis process, a PDU Set-related information configuration process, and a packetization process. The UPF 450, which has received the media packet, uses a packet filter to identify the packets included in the real-time communication media session, and uses the PDU Set Marking method information included in the configuration information of the 5G CN 430 to identify the PDU Set and process the packets. Afterwards, the packet with the general packet radio service (GPRS) tunneling protocol (GTP) header added is delivered to the RAN 460. In case where the RAN 460 provides PDU Set-based packet processing, PDU Set-related information may be added to the GTP header.

An UE 470 may be the same or similar to the UE 101 of FIG. 1. The RAN 460 may be the same or similar to the NG-RAN 102 of FIG. 1. The UPF 450 may be, for example, the same or similar to the UPF 103 of FIG. 1. The RTC AS 440 may be the same or similar to the RTC AS 122 of FIG. 1. The RTC AF 420 may be the same or similar to the RTC AF 121 of FIG. 1.

Figure 5:
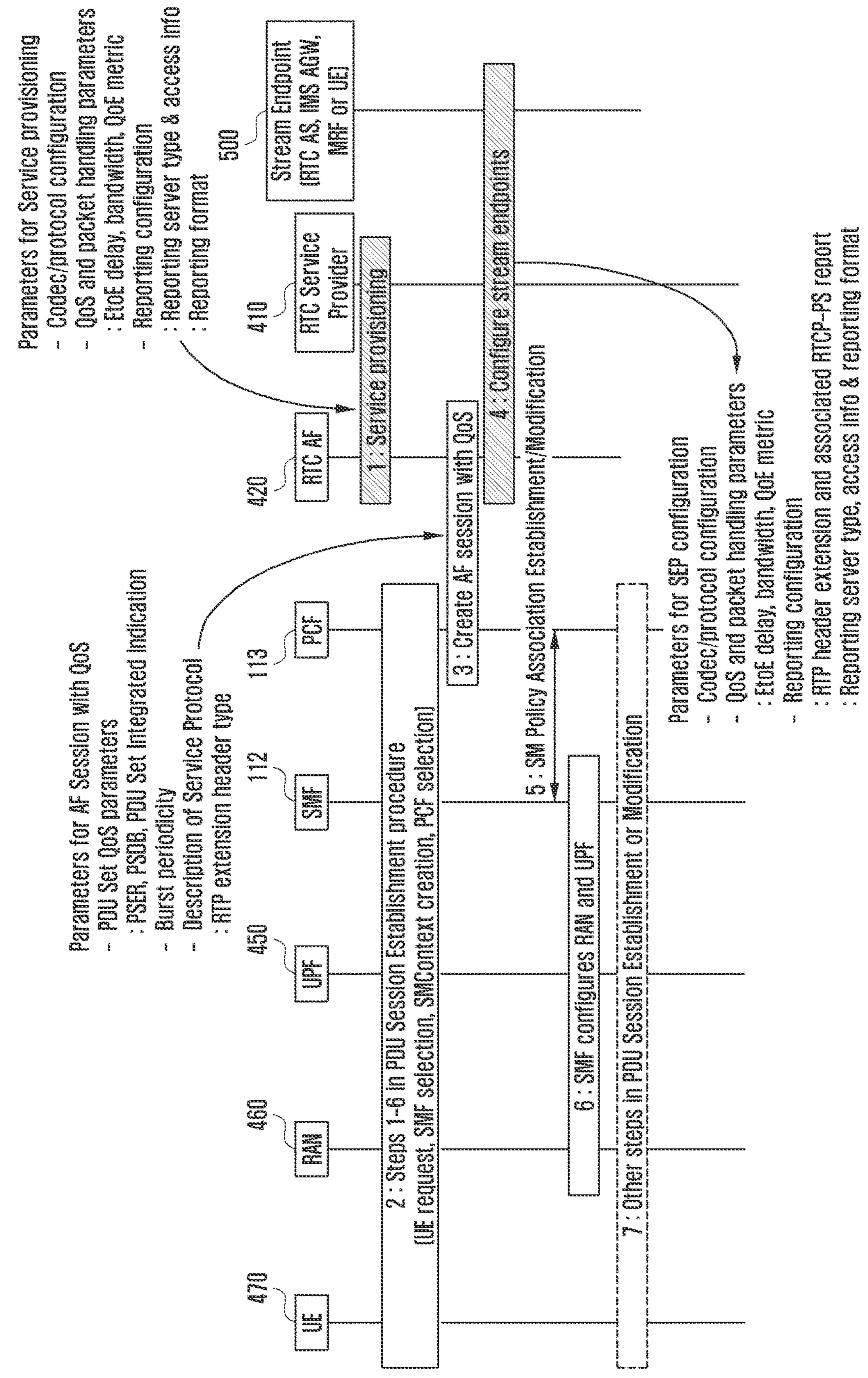
FIG. 5 is a flow chart illustrating a procedure for establishing a real-time media transmission session in a wireless communication system according to an embodiment of the disclosure.

[Establishment Procedure of 5G RTC Media Transmission Session—FIG. 5]

FIG. 5 is a flow chart illustrating a procedure for establishing a real-time media transmission session in a wireless communication system according to an embodiment of the disclosure.

Referring to FIG. 5, Process 1 is a process in which the RTC AF 420 configures a media-based QoS provision service and may use parameters for service provisioning provided by the RTC service provider 410. For example, the RTC service provider 410 may transmit the service provisioning parameters to the RTC AF 120. The RTC AF 120 may receive the service provisioning parameters from the RTC service provider 410. The service provisioning parameters may, for example, include at least one of codec/protocol configuration, marking/detection scheme, QoS and packet handling parameters, and reporting configuration. The marking/detection scheme may include at least one of protocol and extended header information. The Qos and packet processing parameters may include at least one of EtoE delay, bandwidth, and QoE metric. The reporting settings may include at least one of a type of reporting server, reporting server connection information, and reporting format.

Process 2 may include a process necessary to select the PCF 113 to communicate with the RTC AF 420 in a general session establishment procedure (PDU session establishment procedure). This can include a process such as the UE 470's PDU session establishment request (UE request), SMF selection, SMContext creation, and PCF selection. For example, the UE 470, RAN 460, UPF 450, SMF 112, and PCF 113 may perform a session establishment procedure.

Process 3 is a process in which the RTC AF 420 requests resource allocation for a media transmission session from the PCF 113, and media session QoS parameters (parameters for AF Session with Qos) may be provided to the PCF 113. In another embodiment of the disclosure, the media session QoS parameters may be provided to a 5GS prior to media session establishment. In an example, the RTC AF 420 may transmit the media session QoS parameters to the PCF 113. The PCF 113 may receive the media session QoS parameters from the RTC AF 420. The media session QoS parameters may include at least one of session identification (transmission and reception IP address, transmission and reception port number, protocol), media identification (MIME-type), marking/detection scheme, and QoS and packet processing (QoS and packet handling parameters). QoS and packet processing parameters may include at least one of PSDB, PSER, loss tolerance, max PDU set size, PDU Set period, and delay/jitter sensitivity.

Process 4 is a process in which the RTC AF 420 configures a stream endpoint 500, in which the RTC AF 420 may provide parameters for stream endpoint (SEP) configuration to the stream endpoint 500. The RTC AF 420 may, for example, transmit the parameters for SEP configuration to the stream endpoint 500. The stream endpoint 500 may receive the parameters for SEP configuration from the RTC AF 420. The parameters for SEP configuration may include at least one of codec/protocol configuration, marking/detection scheme, QoS and packet processing parameter, and reporting configuration. The stream endpoint configuration process may differ depending on the location and characteristics of the stream endpoint 500, and details will be described later. The stream endpoint 500 may be the RTC AS 440, an IMS access gateway (AGW), a media resource function (MRF), or a terminal.

Process 5 is a process in which the PCF 113 creates a policy and charging control (PCC) rule and transmits the PCC rule to the SMF 112. The PCC rule may include QoS parameters related to the PDU Set. The PCF 113 may, for example, transmit the PCC rule to SMF 112. The SMF 112 may receive the PCC rule from the PCF 113. The PCF 113 and SMF 112 may perform operations for SM policy association establishment/modification.

Process 6 is a process in which the SMF 112 configures the RAN 460 and the UPF 450, and the SMF 112 uses the PCC rule obtained from the PCF 113 to create a QoS profile and an N4 rule. The N4 rule may be distributed to the UPF 450, and the QoS profile may be distributed to the RAN 460 through the AMF 111.

Process 7 refers to the operations after Process 6 in the general session establishment process (other operations in PDU session establishment or modification), and responds to the PDU session establishment request of the UE 470 and may include a process of configuring access network resources. The SEP 500 of the UE 470 may be configured through a NAS SM message or RRC message in operation 7.

In an IP-multimedia subsystem (IMS) network according to an embodiment of the disclosure, the operation of the RTC AF 420 may be performed in a call session control function (CSCF) and an IMS application server (AS).

The service provisioning parameters of Process 1 may, for example, include the following information.

Types and configuration information of serviceable media codecs: AVC-HD, AVC-FullHD, AVC-UHD, HEVC-HD, HEVC-FullHD, HEVC-UHD, EVS, eAAC+, etc.

Media transmission protocols: RTP/UDP/IP, SRTP/DTLS/UDP/IP, HTTP1.x/TCP/IP, HTTP3/QUIC/UDP, RTP/QUIC/UDP, etc.

PDU Set Marking scheme: Header extension url, RTP extension header URI, local identifier mapped to the above URI at multimedia session level or RTP session level, etc.

QoS-related parameter: PDU set delay budget (PSDB), PDU set error rate (PSER), loss tolerance, PDU Set maximum size, PDU Set period, end-to-end delay time (EtoE delay), bandwidth, delay/jitter sensitivity, etc.

Reporting configuration: Reporting server type (for example, RTP Sender, network monitoring function), reporting server connection information (for example, IP address, port number, protocol), reporting format (for example, RTCP message, JSON format, XML format).

The media session QoS parameters of Process 3 above may include the following information.

Media session identification information: Transmission and reception IP addresses, port numbers, protocol identifiers, etc.

Media identification information: MIME type string.

PDU Set Marking scheme: Header extension url, RTP extension header URI, local identifier mapped to the above URI at multimedia session level or RTP session level, etc.

QoS-related parameter: PDU set delay budget (PSDB), PDU set error rate (PSER), loss tolerance, PDU Set maximum size, PDU Set period, bandwidth, delay/jitter sensitivity, etc.

Reporting configuration: Reporting server type (for example, RTP Sender, network monitoring function), reporting server connection information (for example, IP address, port number, protocol), reporting format (for example, RTCP message, JSON format, XML format).

The parameters for SEP configuration of Process 4 may include the following information.

Types and configuration information of serviceable media codecs: AVC-HD, AVC-FullHD, AVC-UHD, HEVC-HD, HEVC-FullHD, HEVC-UHD, EVS, eAAC+, etc.

Media transmission protocol: RTP/UDP/IP, SRTP/DTLS/UDP/IP, HTTP1.x/TCP/IP, HTTP3/QUIC/UDP, RTP/QUIC/UDP, etc.

PDU Set Marking scheme: Header extension url, RTP extension header URI, local identifier mapped to the above URI at multimedia session level or RTP session level, etc.

QoS-related parameter: PDU Set Delay Budget (PSDB), PDU Set Error Rate (PSER), loss tolerance, PDU Set maximum size, PDU Set period, end-to-end delay (EtoE delay), bandwidth, delay/jitter sensitivity, etc.

Reporting configuration: Reporting server type (for example, RTP Sender, network monitoring function), reporting server connection information (for example, IP address, port number, protocol), reporting format (for example, RTCP message, JSON format, XML format).

The stream endpoint that performs PDU Set Marking may be a stream endpoint server located in the network or a stream endpoint terminal owned by the user. The stream endpoint server may have different setup processes depending on a hosting environment or underlying network.

In the case of IP multimedia subsystem (IMS) network, an IMS-access gateway (AGW) or media resource function (MRF) may perform the function of a stream endpoint server. The stream endpoint parameters may be configured by an IMS application server (AS) or operator's internal equipment configuration protocol. The MTSI (multimedia telephony service for IMS) client located in the terminal may perform the stream endpoint terminal function of the IMS network, and the stream endpoint parameters may be configured by a terminal management server such as an application server or OMA DM.

In the communication system according to the embodiment, the stream endpoint configuration process of Process 4 may include an SDP negotiation process between stream endpoints participating in a real-time communication service. In an example, in case of performing PDU Set Marking using an RTP extension header, the mapping information of the RTP extension header identifier expressed as urn and the ID value of the RTP extension header may be determined through the SDP negotiation.

In another example, in case where reporting is performed using an RTCP message, whether to use a specific reporting format may also be determined through the SDP negotiation.

Figure 6:
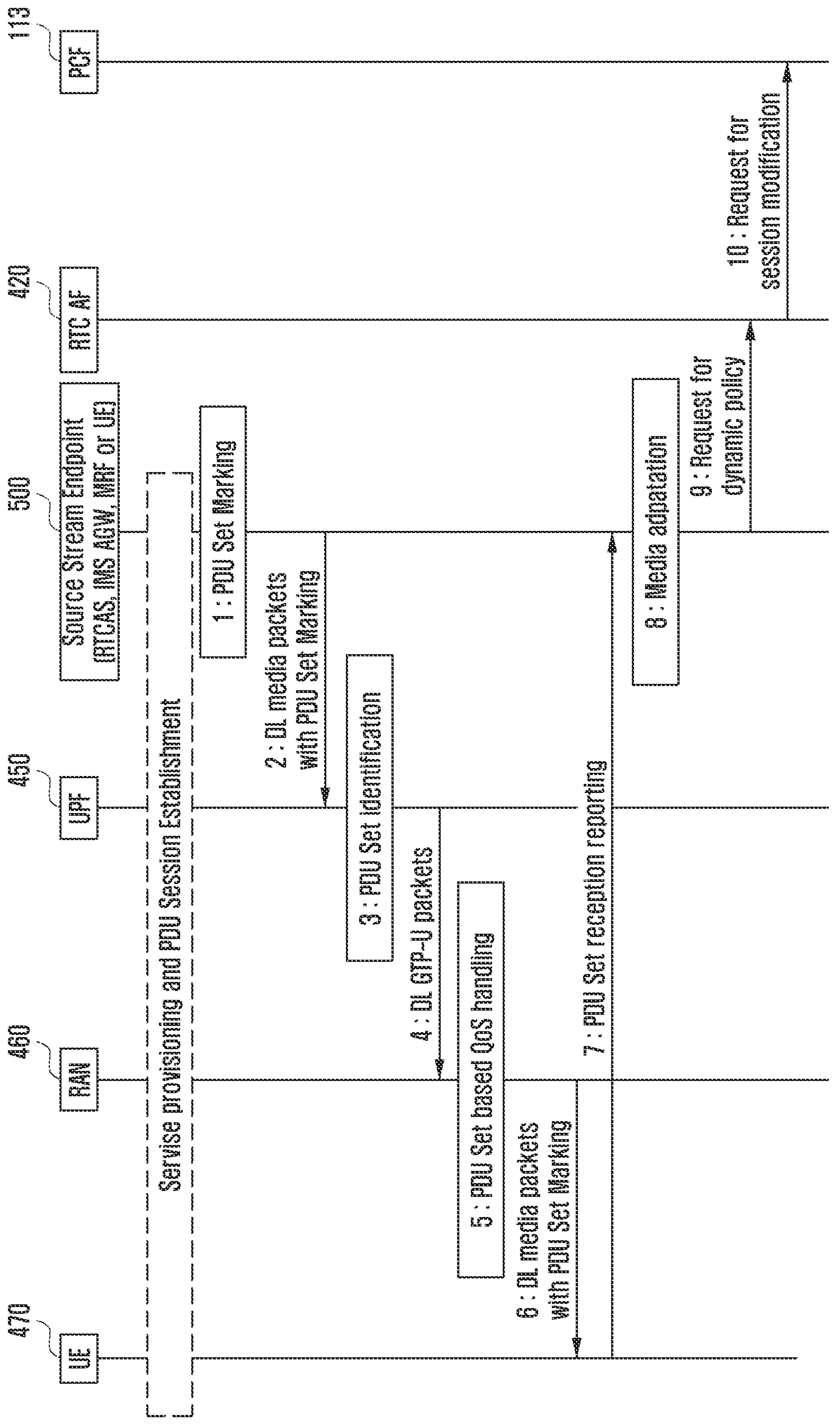
FIG. 6 is a flowchart illustrating a procedure for processing a downlink packet for a real-time communication service in a wireless communication system according to an embodiment of the disclosure.

[DL Packet Process Procedure—FIG. 6]

FIG. 6 is a flowchart illustrating a procedure for processing a downlink packet for a real-time communication service in a wireless communication system according to an embodiment of the disclosure.

Referring to FIG. 6, Process 1 may be a process of creating a downlink packet to which the PDU Set Marking scheme is applied at a stream endpoint (source stream endpoint, 500). The PDU Set Marking scheme may be a scheme that is established during the service provisioning and media session establishment (service provisioning and PDU session establishment) process described above. Detailed parameters may be determined through dynamic negotiation between stream endpoints before transmitting an actual media stream. Parameters for the dynamic negotiation may be transmitted as a protocol message such as session initiation protocol (SIP) and session description protocol (SDP). The RTC AF 420 may, for example, transmit the detailed parameters of the PDU Set Marking scheme determined through the dynamic negotiation to the PCF 113 directly or through the NEF 114. Detailed parameters of the PDU Set Marking scheme obtained by the PCF 113 may be transmitted to the UPF 450 through the internal information transmission process of a 5GS.

Process 2 is a process in which the packet transmitted from the stream endpoint 500 is delivered to the UPF 450, which serves as a PDU session anchor. The stream endpoint 500 may transmit a DL packet including the PDU Set Marking to the UPF 450. The UPF 450 may receive the DL packet including the PDU Set Marking from the stream endpoint 500.

Process 3 is a process in which the UPF 103 identifies the PDU Set based on the PDU Set Marking, recognizes a relationship between the identified PDU Sets (PDU Set identification), and determines the QoS and packet processing scheme to be applied to each PDU Set. In above Process 3, the UPF 450 may add PDU Set-related information to a GTP header for PDU Set-based packet processing of an intermediate UPF (not shown) located on the path to the RAN 460 and the RAN 460.

Process 4 is a process of delivering packets to the RAN 460 through a general packet radio service (GPRS) tunneling protocol (GTP) tunnel. The UPF 450 may transmit a DL GTP-U (user plane) packet to the RAN 460. The RAN 460 may receive the DL GTP-U packet from the UPF 450.

Process 5 is an operations in which the RAN 460 performs PDU Set-based packet processing according to the PDU Set-related information in the GTP header and the policy determined during the media session establishment/modification process. The PDU Set-based packet processing may include packet dropping in units of PDU Sets to relieve network congestion, and packet scheduling considering the importance of the PDU Set.

In Process 6, the RAN 460 may transmit a downlink media packet processed based on the PDU Set to the UE 470. The UE 470 may receive the downlink media packet processed based on PDU Set-based QoS from the RAN 460.

In Process 7, the UE 470 may provide a report including reception information in units of PDU Sets to the stream endpoint 500 that has transmitted the downlink media packet. The user equipment according to an embodiment of the disclosure may provide a report including the reception information in units of the PDU Set to a network entity other than the stream endpoint 500 that has transmitted the downlink media packet, and may obtain information about the network entity from the parameter for SEP configuration described above.

The stream endpoint 500, which has received the report containing reception information in units of the PDU Set, may change the media configuration information based on the contents of the report (Process 8) or request change of QoS configuration for the media transmission session to the PCF 113 through the RTC AF 420 (Processes 9 and 10). The media configuration information change may be a media bit rate adjustment based on the reception information in PDU Set units.

[PDU Set Marking]

PDU Set-related information included in a media transmission session according to an embodiment of the disclosure may be constituted as follows.

PDU Set identification information

PDU Set Sequence Number: PDU Set serial number, unsigned integer.

Start/End PDU of the PDU Set: The first and last PDUs belonging to the PDU Set. It may be signaled as a separate flag with a Boolean value, or may be signaled indirectly through the PDU SN to be described later and the number of PDUs belonging to the PDU Set.

PDU SN within a PDU Set: Serial number of PDU belonging to PDU Set, unsigned integer.

Number of PDUs within a PDU Set: Number of PDUs belonging to PDU Set.

PDU Set processing information

PDU Set importance: Importance of PDU Set. Unsigned integer.

PDU Set dependency: Dependency relationship between PDU Sets. It may be signaled as a list of serial numbers of dependent PDU Sets or number of dependent PDU Sets.

PDU Set period: Period/cycle of PDU Set. It may be signaled in a time-window in which one PDU Set is transmitted or at a certain period, in ms units.

PDU Set loss tolerance: PDU Set loss tolerance, unsigned integer. In case of the value of 0, the entire PDU Sets may not be used at an application layer in case where any of the PDUs in the PDU Set are lost.

PDU Set delay/jitter sensitivity: Delay and jitter sensitivity, unsigned integer. In case of the value of 0, retransmission is possible.

The PDU Set Marking scheme is a scheme for delivering PDU Set-related information to network equipment or an application layer. The scheme may be constituted with in-band information recorded in the packet by using the header, extension header, payload header, etc. of a higher layer transmission protocol, and out-band information delivered in a separate data architecture. In an example, the PDU Set identification information may be in-band information. The PDU Set processing information may be out-band information or a combination of in-band information and out-band information. The out-band information may be transmitted through 5G control plane signaling information or a message of a media session control protocol such as SIP/SDP. The out-band information may be transmitted to an UPF through a PCF as detailed parameters of the PDU Set Marking scheme.

Figure 7:
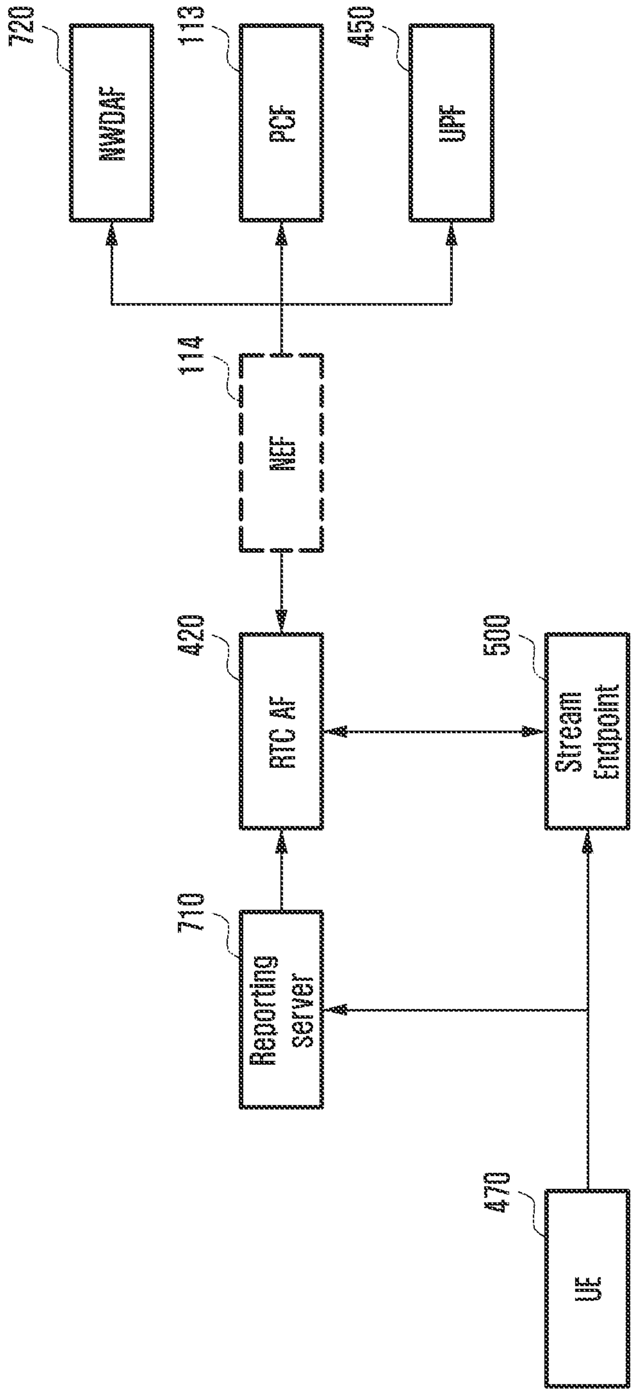
FIG. 7 is a conceptual diagram illustrating a 5G system architecture for transmitting a PDU Set-based reception report in a wireless communication system according to an embodiment of the disclosure.

[PDU Set Reporting Architecture—FIG. 7]

In a communication system according to an embodiment of the disclosure, a terminal receiving a media stream may generate a PDU Set-based reception report and transmit it to a reporting server.

FIG. 7 is a conceptual diagram illustrating a 5G system architecture for transmitting a PDU Set-based reception report in a wireless communication system according to an embodiment of the disclosure.

Referring to FIG. 7, the UE 470 may transmit a PDU Set-based reception report to at least one of the stream endpoint 500 that has transmitted a media stream and a reporting server 710. The stream endpoint 500 may, for example, change transmission media configuration information based on the PDU Set-based reception report or transmit the PDU Set-based reception report or information modified from the PDU Set-based reception report to the RTC AF 420. The reporting server 710 may transmit the PDU Set-based reception report or information modified from the PDU Set-based reception report to the RTC AF 420. The RTC AF 420 interworks with the network function of a 5G system based on the PDU Set-based reception report received from the reporting server 710 or stream endpoint 500 or information modified from the PDU Set-based reception report. The interworking may be performed through direct communication between the RTC AF 420 and the 5G system network function or indirect communication through the NEF 114. The interworking may, for example, include at least one of the RTC AF 420 consuming the service provided by the 5G system network function and the 5G system network function consuming the service provided by the RTC AF 420. In the communication system according to an embodiment of the disclosure, the 5G system network function or service provided by the RTC AF 420 may be provided through Rest API or message notification according to event subscription.

Referring to FIG. 7, the 5G system network function interworking with the RTC AF 420 may be, for example, the PCF 113, UPF 450, or NWDAF 720. The network data analytic function (NWDAF) 720 may analyze a network situation using the PDU Set-based reception report provided by the RTC AF or its modified information and provide the results to other 5G network functions. The RTC AF 420 may, for example, request the PCF 113 to change the QoS configuration for the corresponding media transmission session using the PDU Set-based reception report or its modified information. Additionally, the RTC AF 420 may obtain a 5GS network parameter from the UPF 450 and request a change of transmission media configuration information from the stream endpoint 500 based on the obtained 5GS network parameter.

Information modified from the PDU Set-based reception report may be information necessary for interworking between the RTC AF 420 and the 5G system network function, and its content and format may vary depending on a service provided by the RTC AF 420 or system network function. As one example, the information modified the PDU Set-based reception report may be information that extracts statistical characteristics of the PDU Set-based reception reports. As another example, the information modified from the PDU Set-based reception report may be basic dynamic policy information needed for the RTC AF 420 to request the PCF 113 to change QoS configuration for a media transmission session. The basic dynamic policy information may include at least one of the following parameters.

Minimum requested bit rate for uplink (requested bit rate)
Minimum requested bit rate for downlink (requested bit rate)
Maximum requested bit rate for uplink (requested bit rate)
Maximum requested bit rate for downlink (requested bit rate)
Minimum desired bit rate for uplink (desired bit rate)
Minimum desired bit rate for downlink (desired bit rate)
Desired delay per packet (desired delay)
Desired delay per PDU Set (desired delay)
Desired loss rate per packet (desired loss rate)
Desired loss rate per PDU Set (desired loss rate)

The basic dynamic policy information according to an embodiment of the disclosure may have different values depending on the importance of the PDU Set.

[PDU Set Reporting Data Model]

In a communication system according to an embodiment, a stream endpoint (for example, a terminal) that receives a media stream may generate a PDU Set-based reception report and deliver the generated report to at least one of the stream endpoint that has transmitted the media stream and a reporting server. The PDU Set-based reception report may include at least one of individual PDU Set reception information, session PDU Set reception information, and importance-specific PDU Set reception information. The individual PDU Set reception information may include at least one of the following information.

PDU Set identifier. As one example, a serial number assigned to the PDU Set.

A ratio of packets not received (lost) among packets belonging to the corresponding PDU Set.

An indicator indicating whether all packets belonging to the corresponding PDU Set have been received.

The corresponding PDU Set delay time. As an example, a time from when a first packet of the PDU Set is transmitted to when a last packet of the PDU Set is received.

Corresponding PDU Set jitter. As an example, a deviation of the end-to-end delay time of packets included in the PDU Set.

As an example, the individual PDU Set reception information may be expressed in the following data architecture.

TABLE 1

| 0 | 1 | 2 | 3 |
|---|---|---|---|
| 0 1 2 3 4 5 6 7 8 9 | 0 1 2 3 4 5 6 7 8 9 | 0 1 2 3 4 5 6 7 8 9 | 0 1 |
| PDU Set Sequence Number | | | frac_lost |
| PDU Set Delay | | | |
| PDU Set Jitter | | | |

PDU Set sequence number: 24-bit field indicating the PDU Set identifier associated with the received information.

frac_lost: Ratio of packets not received (lost) among packets belonging to the corresponding PDU Set. In case where all packets belonging to the corresponding PDU Set have been received, it has a value of 0.

PDU Set delay: 32-bit field indicating a time from when a first packet of the corresponding PDU Set is transmitted to when a last packet of the PDU Set is received. The delay time may be calculated based on RTP timestamp or NTP.

PDU Set jitter: Deviation of end-to-end delay time of packets included in the corresponding PDU Set. The delay time deviation may be calculated based on RTP timestamp or NTP.

The individual PDU Set reception report according to an embodiment of the disclosure may include individual PDU Set reception information for one or more PDU Sets, and a data compression scheme for transmission efficiency may be additionally used.

The session PDU Set reception information may include at least one of the following information.

Media transmission session identifier: For example, it may be a 5-tuple (source IP address, destination IP address, source port number, destination port number, transmission protocol) and may be identified with out-band information.

Reporting range: Range of the PDU Set considered in the session PDU Set reception information. In an example, it may be a pair of absolute times indicating a start and end points of collecting information included in the corresponding session PDU Set reception information. In case where the information collection start time is not explicitly given, it may be regarded as a start time of packet reception through the media transmission session. Another example may be an identifier of a first PDU Set and an identifier of a last PDU Set or the identifier of the first PDU Set and a number of PDU Sets, considered in the corresponding session PDU Set reception information.

Number of received PDU Sets: Number of PDU Sets that has been received in whole or in part among the PDU Sets corresponding to a reporting range.

Number of fully received PDU Sets: Number of PDU Sets received without packet loss among the PDU Sets corresponding to a reporting range.

Number of lost PDU sets: Number of PDU sets in which one or more packets are lost among the PDU sets corresponding to a reporting range. A PDU Set in which all packets constituting the PDU Set are lost may be considered as a lost PDU Set and excluded from the number of the above PDU Sets in which some packets are lost.

Number of completely lost PDU Sets: Number of PDU Sets in which all packets constituting one PDU Set among the PDU Sets corresponding to a reporting range have been lost.

Ratio of reception PDU Sets: Ratio of PDU Sets in which all or some of packets are received among the PDU Sets corresponding to a reporting range.

Ratio of fully received PDU Sets: Ratio of PDU Sets received without packet loss among the PDU Sets corresponding to a reporting range.

Ratio of lost PDU Sets: Ratio of PDU Sets in which one or more packets are lost among the PDU Sets corresponding to a reporting range. A PDU Set in which all packets constituting the PDU Set have been lost may be considered as a completely lost PDU Set and excluded from the calculation of the above ratio of partially lost PDU Sets.

Number of completely lost PDU Sets: Number of PDU Sets in which all packets constituting one PDU Set among the PDU Sets corresponding to a reporting range have been lost.

PDU Set latency profile: For example, an average of the PDU Set latency of the PDU Set corresponding to a reporting range. Another example is a weighted average of the PDU Set latency of the PDU Set corresponding to a previous reporting range and PDU Set latency corresponding to the corresponding reporting range. As yet another example, a maximum and minimum values of the PDU Set delay time of the PDU Set corresponding to a reporting range.

PDU Set jitter profile: For example, an average of the PDU Set jitter of the PDU Set corresponding to a reporting range. Another example is a weighted average of the PDU Set jitter of the PDU Set corresponding to a previous reporting range and PDU Set jitter corresponding to the corresponding reporting range. Another example is a maximum and minimum values of PDU Set jitter of the PDU Set corresponding to a reporting range.

The PDU set reception information according to importance may include at least one of individual PDU set reception information and session PDU set reception information measured only for PDU set with the corresponding importance.

In the PDU Set-based reception report according to an embodiment of the disclosure, a reporting range may be configured differently for each report parameter.

In a communication system according to an embodiment, a stream endpoint (for example, terminal) that transmits a media stream may generate a PDU Set-based transmission report and deliver the generated report to at least one of a stream endpoint that receives the media stream and a reporting server. The PDU Set-based transmission report may, for example, include at least one of session PDU Set transmission information and importance-specific PDU Set transmission information. The session PDU Set transmission information may include at least one of the following information.

Media transmission session identifier: For example, it may be a 5-tuple (source IP address, destination IP address, source port number, destination port number, transmission protocol) and may be identified with out-band information.

Reporting range: Range of the PDU Set considered in the session PDU Set transmission information. As one example, it may be a pair of absolute times representing a start and end points of collecting information included in the corresponding session PDU Set transmission information. In case where the information collection start time is not explicitly given, it may be regarded as a start time of packet transmission through the media transmission session. Another example may be an identifier of a first PDU Set and an identifier of a last PDU Set or the identifier of the first PDU Set and a number of PDU Sets considered in the corresponding session PDU Set reception information.

Number of transmission PDU Sets: Number of transmission PDU Sets corresponding to a reporting range The PDU set transmission information for each importance may include session PDU set transmission information measured only for PDU sets with the corresponding importance level.

Figure 8:
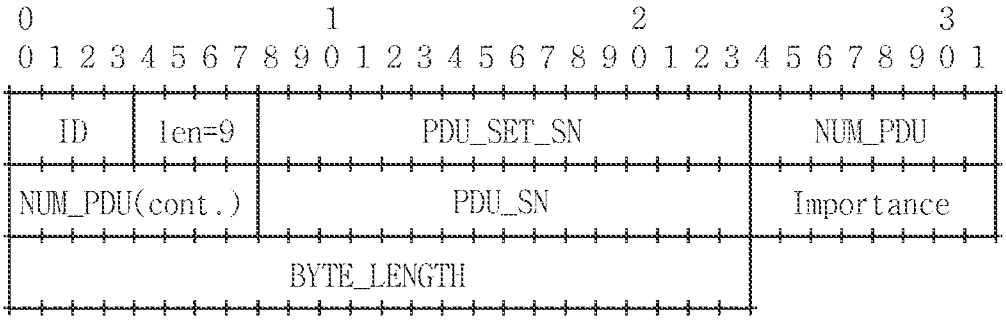
FIG. 8 is a diagram illustrating an example of a real-time transport protocol (RTP) extension header for PDU Set marking according to an embodiment of the disclosure.
Figure 9:
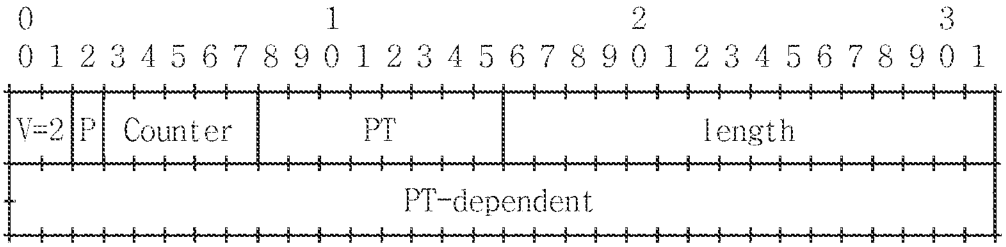
FIG. 9 is a conceptual diagram illustrating an RTP control protocol (RTCP) packet architecture for transmitting a PDU Set-based report according to an embodiment of the disclosure.

[RTCP-Based PDU Set Reporting—FIGS. 8, 9]

A media reception device according to an embodiment of the disclosure may transmit a PDU Set-based reception report using RTP control protocol (RTCP). The information required to generate the PDU Set-based reception report may differ depending on the PDU Set Marking scheme used in a media transmission session. The media transmission session according to an embodiment of the disclosure may use PDU Set Marking using an RTP extension header.

FIG. 8 is a diagram illustrating an example of an RTP extension header for PDU Set Marking according to an embodiment of the disclosure.

Referring to FIG. 8, each field of the RTP extension header has the following meaning.

ID: 4-bit field to identify an extension header for the PDU Set Marking. The value may be determined by static mapping according to service configuration or dynamic mapping determined by an out-band scheme using SDP, etc.

len: 4-bit field indicating a byte length of the fields following this field minus 1.

PDU_SET_SN: 16-bit field indicating a serial number of the PDU Set including the payload of the packet including this extension header.

NUM_PDU: 16-bit field indicating a number of PDUs in the PDU Set to which the payload of the packet including this extension header belongs.

PDU_SN: 16-bit field indicating a serial number of a current PDU in the PDU Set to which the payload of the packet including this extension header belongs.

Importance: 8-bit field indicating the importance of the PDU Set to which the payload of the packet including this extension header belongs.

BYTE LENGTH: 24-bit field indicating a length in bytes of the PDU Set to which the payload of the packet including this extension header belongs.

A media reception device according to an embodiment of the disclosure uses at least one of the packet header information shown in FIG. 3, RTP extension header information for PDU Set Marking, and information included in an RTCP packet according to a conventional art to generate the PDU Set-based reception report.

FIG. 9 is a conceptual diagram illustrating an RTCP packet architecture for transmitting a PDU Set-based reception report according to an embodiment of the disclosure.

Referring to FIG. 9, each field of the RTCP packet has the following meaning.

Version (V): 2-bit field indicating a version of RTCP. RTCP compliant to IETF RFC 3550 has a value of 2.

Padding (P): 1-bit field with a value of 1 in case where the RTCP packet includes a padding octet.

Counter: 5-bit field with different usages depending on a value of PT field. For example, a PT value of 200 indicates that the corresponding RTCP packet is a sender report, and in this case, a counter field value indicates a number of reporting blocks included in the sender report.

PT: 8-bit field indicating an identifier of the corresponding RTCP packet type.

Length: 16-bit field indicating a length of RTCP packet.

PT-dependent: Data architecture with different format and usage depending on a value of PT field A compound RTCP packet may include one or more RTCP packets, and the compound RTCP packet may be transmitted as one packet in a lower layer protocol such as UDP.

The RTCP packet according to an embodiment of the disclosure may include at least one of a PDU Set-based reception report and a PDU Set-based transmission report in the PT-dependent architecture. The overall architecture of the RTCP packet including at least one of the PDU Set-based reception report and the PDU Set-based transmission report may differ depending on service configurations and RTP profile.

Figure 10:
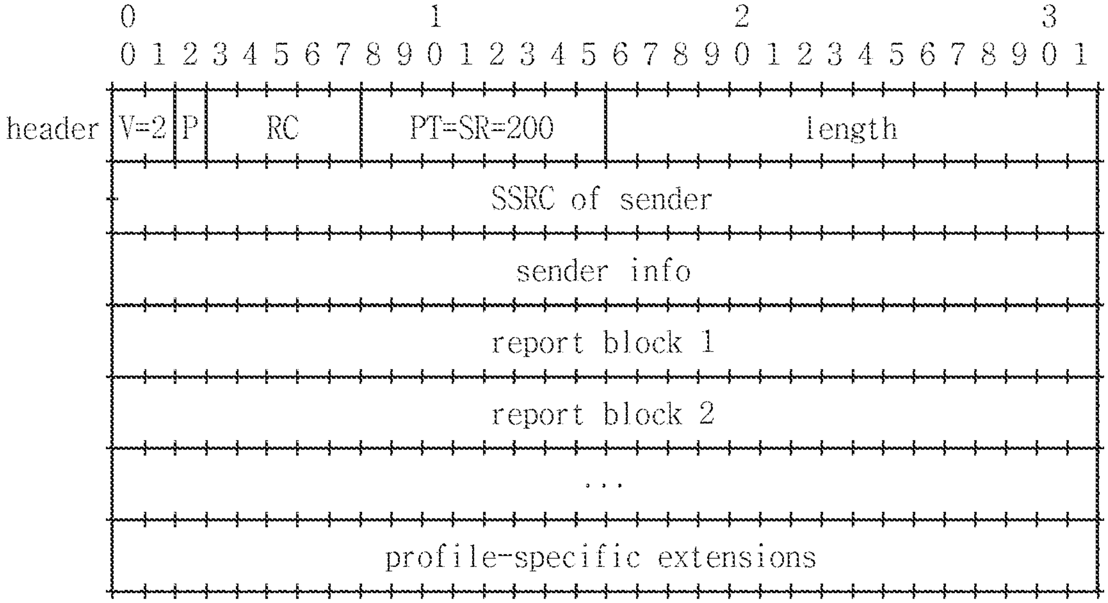
FIG. 10 is a conceptual diagram illustrating an RTCP sender report (SR) packet architecture for transmitting a PDU set-based report according to an embodiment of the disclosure.

[Embodiment 1 RTCP SR Packet—FIG. 10]

The PDU Set-based reception report and transmission report may be transmitted in an extension section of the sender report identified as PT=200.

FIG. 10 is a diagram illustrating the architecture of an RTCP sender report (SR) packet according to an embodiment of the disclosure.

Referring to FIG. 10, the RTCP SR packet may include the following fields or data architecture.

Version (V): 2-bit field indicating a version of RTCP. RTCP compliant to IETF RFC 3550 has a value of 2.

Padding (P): 1-bit field with a value of 1 in case where an RTCP packet includes a padding octet.

Reception report count (RC): 5-bit field indicating a number of reporting blocks included in an RTCP SR packet.

PT: 8-bit field indicating an identifier of an RTCP packet type. For RTCP SR packet, it has a value of 200.

Length: 16-bit field indicating a length of an RTCP packet.

SSRC: 32-bit field indicating a synchronization source identifier of a stream endpoint transmitting this RTCP SR packet.

Sender info: Data architecture with 20-octet length, including information about a media transmission stream endpoint.

Report block: Data architecture that provides statistical characteristics about RTP packets received from a single synchronization source.

Profile-specific extensions: Data architecture for transmitting extension information The RTCP SR packet according to an embodiment of the disclosure may include the following session PDU Set transmission information in the profile-specific extension.

TABLE 2

| 0 | 1 | 2 | 3 |
|---|---|---|---|
| 0 1 2 3 4 5 6 7 8 9 | 0 1 2 3 4 5 6 7 8 9 | 0 1 2 3 4 5 6 7 8 9 | 0 1 |
| sender's PDU Set count | | | |

The sender's PDU Set count represents a total number of PDU Sets transmitted from a time when the stream endpoint transmitting the RTCP SR packet starts media data transmission to a time of generating the RTCP SR packet. Among the above-described session PDU Set transmission information, the media transmission session identifier and reporting range may be transmitted in a lower layer protocol header including a preceding field of the RTCP SR packet and the RTCP SR packet.

The RTCP SR packet according to another embodiment of the disclosure may include the following PDU Set transmission information according to importance in the profile-specific extension.

TABLE 3

| 0 0 1 2 3 4 5 6 7 8 9 | 1 0 1 2 3 4 5 6 7 8 9 2 0 1 2 3 4 5 6 7 8 9 3 0 1 |
|---|---|
| Record counter | reserved |
| Importance_1 | PDU Set count for Importance_1 |
| Importance_2 | PDU Set count for Importance_2 |
| | . . . |

Record counter: 8-bit field indicating a number of (Importance_i, PDU Set count for Importance_i) pairs to follow Importance_i: i-th importance value (importance) of the PDU Set transmitted by the stream endpoint transmitting the RTCP SR packet.

PDU Set count for Importance_i: Total number of PDU sets with an importance value of Importance_i among the PDU sets transmitted from the time when the stream endpoint transmitting the RTCP SR packet starts media data transmission to the time of generating the RTCP SR packet.

The RTCP SR packet according to an embodiment of the disclosure may include the following session PDU Set reception information in the profile-specific extension.

TABLE 4

| 0 0 1 2 3 4 5 6 7 8 9 | 1 0 1 2 3 4 5 6 | 7 8 9 2 0 1 2 3 4 5 6 7 8 9 3 0 1 |
|---|---|---|
| count flags | DJ flags | reserved |
| fraction 1 | | PDU Set count 1 |
| | . . . | |
| fraction N | | PDU Set count N |
| | Delay/Jitter 1 | |
| | . . . | |
| | Delay/Jitter M | |

Count flags: 8-bit field including indicators indicating the presence or absence of a reporting parameter (fraction i, PDU Set count i) information pair to be followed. As an example, the count flag may include at least one of received (R), completely received (CR), partially received (PR), and completely lost (CL) fields, each of which is 1 bit in length. In this case, the R field may represent whether information exists on a ratio and number of the PDU Sets that have been received in whole or in part, the CR field may represent whether information exists on a ratio and number of the PDU Sets that have been received in their entirety without loss, the PR field may represent whether information exists on a ratio and number of PDU Sets that have been only partially received, and the CL field may indicate whether information exists on a ratio and number of PDU Sets that have been not received in their entirety.

DJ flags: 8-bit field including indicators indicating the presence or absence of delay and jitter-related reporting parameters (Delay/Jitter i) information to be followed. As an example, the DJ flag may include at least one of average delay (AD), weighted average delay (WaD), maximum delay (MaxD), minimum delay (MinD), average jitter (AJ), weighted average jitter (WaJ), Maximum Jitter (MaxJ), and Minimum Jitter (MinJ) fields, each of which is 1 bit in length.

fraction i: 8-bit field indicating a ratio of the PDU sets that satisfy the i-th condition among the PDU sets corresponding to a reporting range. The i-th condition may follow the format and usage of the preceding count flag or may be determined in advance depending on the application.

PDU Set count i: 24-bit field indicating a number of PDU Sets that satisfy the i-th condition among PDU Sets corresponding to the reporting range. The i-th condition may follow the format and usage of the preceding count flag or may be determined in advance depending on the application.

Delay/Jitter i: 32-bit field indicating an i-th reporting parameter value related to delay and jitter. The i-th reporting parameter may be indicated by a preceding DJ flag or may be predetermined depending on an application.

The i-th value of the count flag or DJ flag being configured to 1 may indicate that the i-th reporting parameter has a valid value, or that a field representing the i-th reporting parameter value exists, depending on an implementation.

The reporting parameter according to an embodiment of the disclosure may further include an identifier for identifying the reporting parameter. The count flag and DJ flag may each be replaced with a field indicating a number of reporting parameters, and the format and usage of each reporting parameter may be determined based on the reporting parameter identifier.

The RTCP SR packet according to an embodiment of the disclosure may include one or more session PDU Set reception information generated according to importance in the profile-specific extension.

The RTCP SR packet according to an embodiment of the disclosure may include individual PDU Set reception information in the profile-specific extension.

Among the above-described session PDU Set reception information, the media transmission session identifier and reporting range may be transmitted in a lower layer protocol header including a preceding field of the RTCP SR packet and the RTCP SR packet.

[Embodiment 2 RTCP RR Packet]

The RTCP Receiver Report (RR; PT=201) packet according to an embodiment has the same architecture as the RTCP SR packet described above except that the sender info data architecture is omitted, and may include at least one of session PDU Set reception information, PDU Set reception information by importance, and individual PDU Set reception information in a profile-specific extension.

Figure 11:
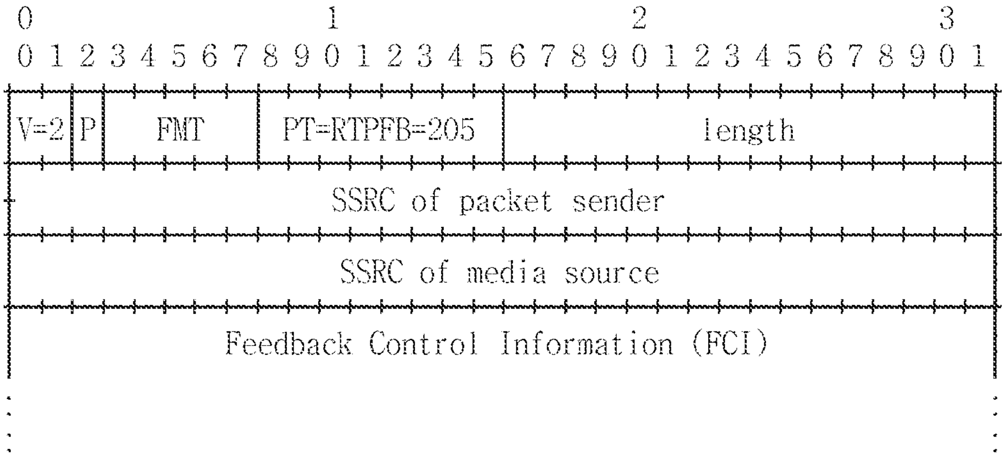
FIG. 11 is a conceptual diagram illustrating an RTCP RTP feedback (RTPFB) packet architecture for transmitting a PDU Set-based report according to an embodiment of the disclosure.

[Embodiment 3 RTCP RTPFB Packet—FIG. 11]

The PDU Set-based reception report and transmission report according to an embodiment may be transmitted as a generic RTP feedback (RTPFB) packet identified as PT=205.

FIG. 11 is a diagram illustrating the architecture of an RTCP RTPFB packet according to an embodiment of the disclosure.

Referring to FIG. 11, the RTCP packet may include the following fields or data architecture.

- Version (V): 2-bit field indicating a version of RTCP. RTCP compliant to IETF RFC 3550 has a value of 2.
- Padding (P): 1-bit field with a value of 1 in case where an RTCP packet includes a padding octet.
- Feedback message type (FMT): 5-bit field to identify the type of feedback (FB) message. The FB message type indicated by the FMT field value may be defined depending on a subsequent PT field value.
- PT: 8-bit field indicating an identifier of an RTCP packet type. For RTCP RTPFB packet, it has a value of 205.
- Length: 16-bit field indicating a length of an RTCP packet.
- SSRC of packet sender: 32-bit field indicating a synchronization source identifier of a stream endpoint transmitting this RTCP RTPFB packet.
- SSRC of media sender: 32-bit field indicating a synchronization source identifier of the stream endpoint associated with a FB message included in this RTCP RTPFB packet.

Feedback Control Information (FCI): Variable length field including a FB message according to type.

The RTCP RTPFB (PT=205) packet according to the embodiment may include at least one of the above-described session PDU Set reception information, PDU Set reception information by importance, session PDU Set transmission information, importance-specific PDU Set transmission information, and individual PDU Set reception information in the FCI data architecture of the RTCP RTPFB packet, and the type and format of the information may be identified by the FMT field value. As one example, the FMT field of the RTCP RTPFB packet including the session PDU Set reception information may have a value of 12. Among the reporting information, the media transmission session identifier and reporting range may be transmitted in a lower layer protocol header including the header of the RTCP FCI packet, the FCI data architecture, and the RTCP RTPFB packet.

[Embodiment 4 RTCP APP, RTCP XR Packet]

The RTCP APP (Application; PT=204) packet or RTCP XR (Extended Report; PT=207) according to an embodiment may include at least one of the above-described session PDU Set reception information, PDU Set reception information by importance, session PDU Set transmission information, PDU Set transmission information by importance and individual PDU Set reception information in the PT-dependent data architecture of the RTCP APP packet or RTCP XR packet. Among the reporting information, the media transmission session identifier and reporting range may be transmitted in the header of the RTCP APP packet or RTCP XR packet, a PT-dependent data architecture, and a lower layer protocol header including the RTCP APP packet or RTCP XR packet.

In a media receiving device according to an embodiment, a specific RTCP packet format including an information block and a report block for the PDU Set-based reception report and a reporting format according to the packet format may be determined through an out-band scheme such as an SDP negotiation process.

Figure 12:
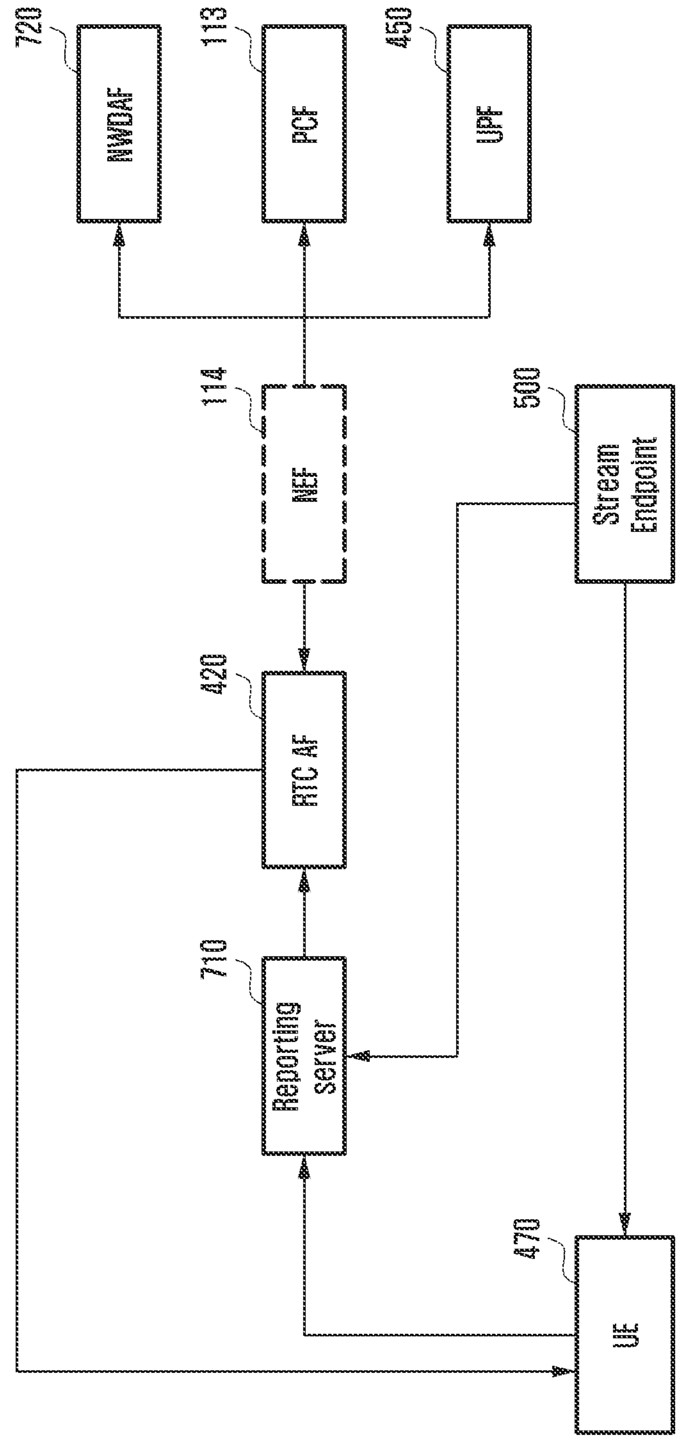
FIG. 12 is a conceptual diagram illustrating a 5G system architecture for utilizing a PDU set-based reception report received by a terminal in a wireless communication system according to an embodiment of the disclosure.

[PDU Set Reporting Architecture 2—FIG. 12]

In a communication system according to an embodiment, a terminal transmitting a media stream may receive a PDU Set-based reception report from a stream endpoint receiving media stream and transmit the report to a reporting server or RTC AF.

FIG. 12 is a conceptual diagram illustrating a 5G system architecture for utilizing a PDU Set-based reception report received by a terminal in a wireless communication system according to an embodiment of the disclosure.

Referring to FIG. 12, the stream endpoint 500 may transmit a PDU Set-based reception report to at least one of the UE 470 that has transmitted media stream and the reporting server 710. The UE 470 may change transmission media configuration information based on the PDU Set-based reception report or transmit the PDU Set-based reception report or information modified from the PDU Set-based reception report to at least one of the RTC AF 420 and reporting server 710. The reporting server 710 may, for example, transmit the PDU Set-based reception report or information modified from the PDU Set-based reception report to the RTC AF 420. The RTC AF 420 may interwork with the network function of a 5G system based on the PDU Set-based reception report received from the reporting server 710 or UE 470 or information modified from the PDU Set-based reception report. The interworking may be performed through direct communication between the RTC AF 420 and the 5G system network function or indirect communication through the NEF 114. The interworking may also include at least one of the RTC AF 420 consuming the service provided by the 5G system network function and the 5G system network function consuming the service provided by the RTC AF 420. In the communication system according to an embodiment, the service provided by the 5G system network function or RTC AF 420 may be provided through Rest API or message notification according to event subscription.

Referring to FIG. 12, the network function of the 5G system interworking with the RTC AF 420 may be, for example, the PCF 113, UPF 450, or NWDAF 720. The operation in which the RTC AF 420 interworks with the 5G system network functions and the content and acquisition process of information used for the operation are in accordance with the embodiment described in FIG. 7.

Figure 13:
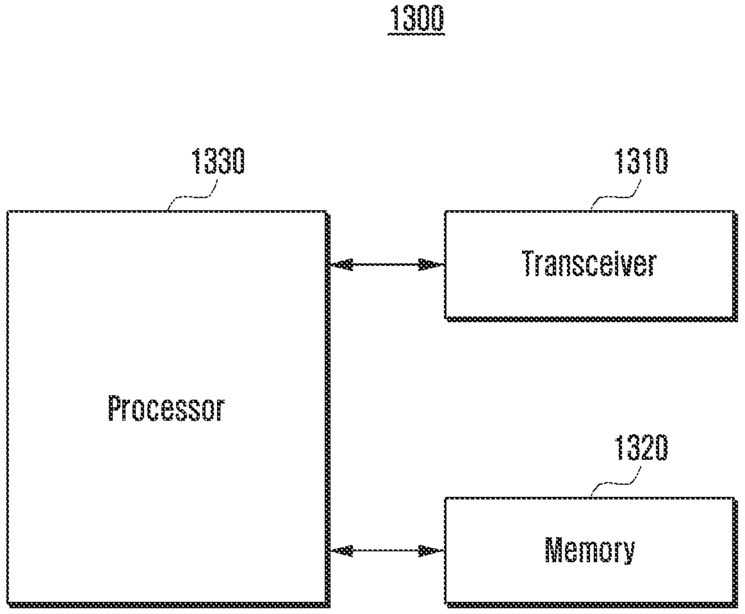
FIG. 13 is a diagram illustrating an example of a terminal capable of performing according to an embodiment of the disclosure.

FIG. 13 is a diagram illustrating an example of a terminal capable of performing according to an embodiment of the disclosure.

Referring to FIG. 13, a terminal 1300 may include a transceiver 1310, a memory 1320, and a processor 1330. However, the elements of the terminal are not limited to the above-described example. For example, the terminal may include more elements or fewer elements than the above-described elements. Also, at least some or all of the transceiver 1310, the memory 1320, and the processor 1330 may be implemented in the form of a single chip.

For example, the transceiver 1310 may transmit and receive signals with a communication device. The above described signal may include control information and data. To this end, the transceiver 1310 may include an RF transmitter that performs up-conversion and amplification on a frequency of a signal to be transmitted, and an RF receiver that performs low-noise amplification on a received signal and performs down-conversion on a frequency of the received signal. Also, the transceiver 1310 may receive a signal through a radio channel, output the signal to the processor 1330, and transmit an output signal of the processor 1330 through the radio channel.

For example, the memory 1320 may store programs and data necessary for the operation of the terminal. Also, the memory 1320 may store control information or data included in the signal transmitted and received by the terminal. The memory 1320 may be constituted as a storage medium, such as ROM, RAM, hard disk, CD-ROM, and DVD, or a combination of these storage media. Also, the memory 1320 may include a plurality of memories. According to an embodiment, the memory 1320 may store a program for executing the operations for the terminal to generate a first control message including a control message delivery (CMD) layer header which is a basis of determining for a communication device to determine the destination of the first control message among a central unit (CU) and network functions (NFs) of a base station, and for the terminal to transmit the first control message to the communication device.

For example, the processor 1330 may control a series of processes that enable the terminal to operate according to the above-described embodiments of the disclosure. In an embodiment of the disclosure, the processor 1330 may execute the program stored in the memory 1320 to control the operations of generating a first control message including a control message delivery (CMD) layer header which is a basis of determining for a communication device to determine the destination of the first control message among a central unit (CU) and network functions (NFs) of a base station, and for transmitting the first control message to the communication device.

Figure 14:
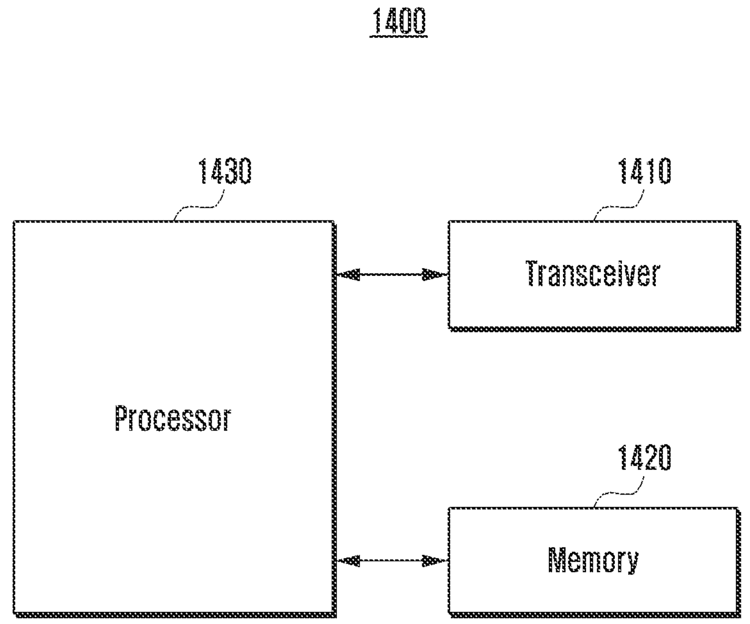
FIG. 14 is a diagram illustrating an example of a communication device capable of performing according to an embodiment of the disclosure.

FIG. 14 is a diagram illustrating an example of a communication device capable of performing according to an embodiment of the disclosure.

The communication device may include at least one of a base station (e.g., RAN), UPF, SMF, PCF, RTC AF, RTC service provider, and stream endpoint.

Referring to FIG. 14, the communication device 1400 may include a transceiver 1410, a memory 1420, and a processor 1430. However, the elements of the communication device are not limited to the above-described example. For example, the communication device may include more elements or fewer elements than the above-described elements. Also, the transceiver 1410, the memory 1420, and the processor 1430 may be implemented in the form of a single chip.

For example, the transceiver 1410 may transmit and receive signals with the terminal or other communication device. The above described signal may include control information and data. To this end, the transceiver 1410 may include an RF transmitter that performs up-conversion and amplification on a frequency of a signal to be transmitted, and an RF receiver that performs low-noise amplification on a received signal and performs down-conversion on a frequency of the received signal. Also, the transceiver 1410 may receive a signal through a radio channel, output the signal to the processor 1430, and transmit an output signal of the processor 1430 through the radio channel.

For example, the memory 1420 may store programs and data necessary for the operation of the terminal. Also, the memory 1420 may store control information or data included in the signal transmitted and received by the terminal. The memory 1420 may be constituted as a storage medium, such as ROM, RAM, hard disk, CD-ROM, and DVD, or a combination of these storage media. Also, the memory 1420 may include a plurality of memories. According to an embodiment, the memory 1420 may store a program for executing the operations for the communication device to receive a first control message including a control message delivery (CMD) layer header from the terminal, determine the destination of the first control message among the central unit (CU) and network functions (NFs) of the base station based on the control message delivery layer header, and transmit, to the destination, a second control message related to the first message.

For example, the processor 1430 may control a series of processes that enable the communication device to operate according to the above-described embodiments of the disclosure. For example, the processor 1430 may execute the program stored in the memory 1420 to control the operations of receiving a first control message including a control message delivery (CMD) layer header from the terminal, determining the destination of the first control message among the central unit (CU) and network functions (NFs) of the base station based on the control message delivery layer header, and transmitting, to the destination, a second control message related to the first message.

The methods according to the embodiments of the disclosure, which are described in the claims or the specification of the disclosure, may be implemented as hardware, software, or a combination of hardware and software.

In case of being implemented by software, a computer-readable storage medium or computer program product for storing one or more programs (software modules) may be provided. One or more programs stored in the computer-readable storage medium or computer program product are configured to be executable by one or more processors in an electronic device. One or more programs include instructions that cause the electronic device to execute the methods according to the embodiments of the disclosure, which are described in the claims or the specification of the disclosure.

The one or more programs (software modules, or software) may be stored in random access memory, non-volatile memory including flash memory, read only memory (ROM), electrically erasable programmable read only memory (EEPROM), magnetic disc storage device, compact disk-ROM (CD-ROM), digital versatile discs (DVDs), other types of optical storage devices, or magnetic cassette. The one or more programs may be stored in a memory provided by a combination of all or part of these devices. Also, each memory may include a plurality of configured memories.

The one or more programs may be stored in an attachable storage device that is accessible through a communication network such as Internet, intranet, local area network (LAN), wide LAN (WLAN), or storage area network (SAN), or a communication network provided by a combination thereof. These storage devices may be connected through an external port to a device that performs the embodiments of the disclosure. Also, a separate storage device on the communication network may access the device that performs the embodiment of the disclosure.

In various embodiments of the disclosure, the elements included in the disclosure have been expressed in the singular or plural form according to the suggested specific embodiments of the disclosure. However, the expression in the singular or plural form is appropriately selected according to the suggested situations for convenience of explanation and is not intended to limit the disclosure to the single or plural elements. Even when a certain element is expressed in the plural form, it may be provided with a single element, and even when a certain element is expressed in the singular form, it may be provided with a plurality of elements.

Meanwhile, the embodiments of the disclosure disclosed in the specification and the drawings have been provided only as specific examples in order to easily describe the technical contents of the disclosure and assist in understanding the disclosure and do not limit the scope of the disclosure. In other words, it will be apparent to one of ordinary skill in the art that other modifications based on the technical ideas of the disclosure are feasible. The embodiments may be combined with each other as required. For example, a portion of one embodiment of the disclosure and a portion of another embodiment of the disclosure may be combined to operate the base station and terminal. In addition, the embodiments of the disclosure may be implemented in other communication systems, and modified examples of the embodiments based on the technical ideas of the embodiments may be implemented in other systems, such as LTE system, 5G or NR system.

Any such software may be stored in non-transitory computer readable storage media. The non-transitory computer readable storage media store one or more computer programs (software modules), the one or more computer programs include computer-executable instructions that, when executed by one or more processors of an electronic device, cause the electronic device to perform a method of the disclosure.

Any such software may be stored in the form of volatile or non-volatile storage such as, for example, a storage device like read only memory (ROM), whether erasable or rewritable or not, or in the form of memory such as, for example, random access memory (RAM), memory chips, device or integrated circuits or on an optically or magnetically readable medium such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a user equipment (UE) in a wireless communication system, the method comprising:
- performing a packet data unit (PDU) session establishment procedure with at least one network entity;
- receiving, from a media server, PDU set marking information including information for identifying packets belonging to at least one PDU set and information associated with a processing method of the packets;
- receiving, from the media server, processed packets in PDU set units based on the at least one PDU set;
- generating a PDU set reception report associated with monitoring the processed packets based on the information associated with the processing method; and
- transmitting, to the media server, the PDU set reception report.

2. The method of claim 1, wherein the PDU set reception report includes at least one of a sequence number for the at least one PDU set, a ratio of packets not received among the packets belonging of the at least one PDU set, an indicator indicating whether all packets of the at least one PDU set are received, a delay time of the at least one PDU set, or jitter of the at least one PDU set.

3. The method of claim 1, further comprising:
- receiving, from the media server, PDU set transmission information including at least one of a media transmission identifier, information on reporting range or a number of a transmission PDU set,
- wherein the PDU set reception report includes at least one of the media transmission identifier, the information on reporting the range, or the number of the transmission PDU set.

4. The method of claim 1, wherein the PDU set reception report includes PDU set reception information according to an importance of the at least one PDU set.

5. The method of claim 1, wherein the PDU set reception report is configured in a format of a real-time transport control protocol (RTCP) message.

6. A method performed by a media server in a wireless communication system, the method comprising:
- transmitting, to a user equipment (UE), packet data unit (PDU) set marking information including information for identifying packets belonging to at least one PDU set and information associated with a processing method of the packets;
- transmitting, the UE, processed packets in PDU set units based on the at least one PDU set; and
- receiving, from the UE, a PDU set reception report associated with monitoring the processed packets based on the information associated with the processing method.

7. The method of claim 6, wherein the PDU set reception report includes at least one of a sequence number for the at least one PDU set, a ratio of packets not received among the packets belonging to the at least one PDU set, an indicator indicating whether all packets of the at least one PDU set are received, a delay time of the at least one PDU set, or jitter of the at least one PDU set.

8. The method of claim 6, further comprising:
- transmitting, to the UE, PDU set transmission information including at least one of a media transmission identifier, information on reporting a range, or a number of a transmission PDU set,
- wherein the PDU set reception report includes at least one of the media transmission identifier, the information on reporting the range, or the number of the transmission PDU set.

9. The method of claim 6, further comprising:
- determining a change for a media configuration based on the PDU set reception report,
- wherein the PDU set reception report includes PDU set reception information according to an importance of the at least one PDU set.

10. The method of claim 6, wherein for the PDU set reception report is configured in a format of a real-time transport control protocol (RTCP) message.

11. A user equipment (UE) in a wireless communication system, the UE comprising:

a transceiver; and a processor communicatively coupled with the transceiver and configured to:

perform a packet data unit (PDU) session establishment procedure with at least one network entity, receive, from a media server, PDU set marking information including information for identifying packets belonging to at least one PDU set and information associated with a processing method of the packets, receive, from the media server, processed packets in PDU set units based on the at least one PDU set, generate a PDU set reception report associated with monitoring the processed packets based on the information associated with the processing method, and transmit, to the media server, the PDU set reception report.

12. The UE of claim 11, wherein the PDU set reception report includes at least one of a sequence number for the at least one PDU set, a ratio of packets not received among the packets belonging to the at least one PDU set, an indicator indicating whether all packets of the at least one PDU set are received, a delay time of the at least one PDU set, or a jitter of the at least one PDU set.

13. The UE of claim 11, wherein the processor is further configured to:

receive, from the media server, PDU set transmission information including at least one of a media transmission identifier, information on reporting a range, or a number of a transmission PDU set, and wherein the PDU set reception report includes at least one of the media transmission identifier, the information on reporting the range, or the number of the transmission PDU set.

14. The UE of claim 11, wherein the PDU set reception report includes PDU set reception information according to an importance of the at least one PDU set.

15. The UE of claim 11, wherein the PDU set reception report is configured in a format of a real-time transport control protocol (RTCP) message.

16. A media server in a wireless communication system, the media server comprising:

a transceiver; and a processor communicatively coupled with the transceiver and configured to:

transmit, to a user equipment (UE), packet data unit (PDU) set marking information including information for identifying packets belonging to at least one PDU set and information associated with a processing method of the packets, transmit, to the UE, processed packets in PDU set units based on the at least one PDU set, and receive, from the UE, a PDU set reception report associated with monitoring the processed packets based on the information associated with the processing method.

17. The media server of claim 16, wherein the PDU set reception report includes at least one of a sequence number for the at least one PDU set, a ratio of packets not received among the packets belonging to the at least one PDU set, an indicator indicating whether all packets of the at least one PDU set are received, a delay time of the at least one PDU set, or a jitter of the at least one PDU set.

18. The media server of claim 16, wherein the processor is further configured to:

transmit, to the UE, PDU set transmission information including at least one of a media transmission identifier, information on reporting a range or a number of a transmission PDU set, and wherein the PDU set reception report includes at least one of the media transmission identifier, the information on reporting the range or the number of the transmission PDU set.

19. The media server of claim 16, wherein the processor is further configured to:

determine a change for a media configuration based on the PDU set reception report, and wherein the PDU set reception report includes PDU set reception information according to importance of the at least one PDU set.

20. The media server of claim 16, wherein the PDU set reception report is configured in a format of a real-time transport control protocol (RTCP) message.

* * * * *